(12) United States Patent
Rinehart et al.

(10) Patent No.: US 9,864,885 B2
(45) Date of Patent: *Jan. 9, 2018

(54) STORAGE CONCIERGE

(71) Applicant: DUFL, LLC, Tempe, AZ (US)

(72) Inventors: William H. Rinehart, Paradise Valley, AZ (US); Albert J. McGowan, San Francisco, CA (US); Michael M. Gordon, Paradise Valley, AZ (US)

(73) Assignee: DUFL, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/340,876

(22) Filed: Nov. 1, 2016

(65) Prior Publication Data

US 2017/0140183 A1 May 18, 2017

Related U.S. Application Data

(63) Continuation-in-part of application No. 14/634,369, filed on Feb. 27, 2015, now Pat. No. 9,552,504, which
(Continued)

(51) Int. Cl.
*G06F 19/00* (2011.01)
*G06Q 30/00* (2012.01)
(Continued)

(52) U.S. Cl.
CPC ...... *G06K 7/10366* (2013.01); *G06K 19/06028* (2013.01); *G06K 19/06037* (2013.01); *G06K 19/07758* (2013.01); *G06Q 10/0833* (2013.01)

(58) Field of Classification Search
CPC ......... G06F 19/00; G06F 17/00; G06Q 30/00; G06Q 90/00; G06Q 10/00; G06K 19/00
(Continued)

(56) References Cited

U.S. PATENT DOCUMENTS 5,299,116 A   3/1994   Owens et al.
5,818,336 A   10/1998  Varga et al.
(Continued)

FOREIGN PATENT DOCUMENTS

CA   2343775 A1   3/2000
CN   103268504 A   8/2013
(Continued)

OTHER PUBLICATIONS

Author Unknown "Lugless Luggage Shipping" *Lugless*. Web. Apr. 2015, all pages. <http://www.lugless.com/>.
(Continued)

*Primary Examiner* — Edwyn Labaze
(74) *Attorney, Agent, or Firm* — Kilpatrick Townsend & Stockton LLP

(57) ABSTRACT

Embodiments are generally, and without limitation, related to devices, systems, and methods that allow one or more users to store objects, in a fixed storage in a remote storage enclosure, that the user can have shipped to themselves anywhere. More specifically, but without limitation, a user sends objects directly or indirectly from a merchandise provider, to a fixed storage provided by a storage concierge at a Unique Address assigned to the user by the storage concierge. The storage concierge tags each object with an unique code and creates an inventory of each object it receives for the user. The storage concierge processes each object and then stores the objects in the user's fixed storage associated with the Unique Address. When the user needs one or more objects, the user requests the objects to shipped to a desired location. The storage concierge takes the objects from the fixed storage and ships them accordingly. When the user is finished using the objects, the user requests that the objects be returned to the closet. The storage concierge ships the objects to the storage enclosure, processes the objects,
(Continued)

and returns them to the fixed storage associated with the users Unique Address.

20 Claims, 26 Drawing Sheets

Related U.S. Application Data is a continuation of application No. 14/583,006, filed on Dec. 24, 2014, now Pat. No. 9,177,186.

(60) Provisional application No. 62/249,736, filed on Nov. 2, 2015, provisional application No. 62/056,247, filed on Sep. 26, 2014.

(51) Int. Cl.
| | | |
|---|---|---|
| *G06Q 90/00* | (2006.01) | |
| *G06K 7/10* | (2006.01) | |
| *G06K 19/06* | (2006.01) | |
| *G06K 19/077* | (2006.01) | |
| *G06Q 10/08* | (2012.01) | |

(58) Field of Classification Search
USPC ....... 235/385, 375, 487; 705/7.27, 14.24, 28
See application file for complete search history.

(56) References Cited

U.S. PATENT DOCUMENTS

| | | | |
|---|---|---|---|
| 6,010,239 | A | 1/2000 | Hardgrave et al. |
| 6,433,732 | B1 | 8/2002 | Dutta et al. |
| 7,183,919 | B2 | 2/2007 | Wang |
| 7,281,615 | B2 | 10/2007 | Siwak et al. |
| 7,378,604 | B2 | 5/2008 | Truong |
| 7,394,165 | B2 | 7/2008 | Schiller |
| 7,447,562 | B2 | 11/2008 | Quackenbush et al. |
| 7,511,617 | B2 | 3/2009 | Burman et al. |
| 7,757,947 | B2 | 7/2010 | Reznik et al. |
| 8,077,041 | B2 | 12/2011 | Stern et al. |
| 8,164,452 | B2 | 4/2012 | Moses et al. |
| 8,358,199 | B2 | 1/2013 | Nesling |
| 8,485,329 | B1 | 7/2013 | Roy et al. |
| 8,624,934 | B2 | 1/2014 | Paushkina et al. |
| 2003/0061085 | A1 | 3/2003 | Lanigan |
| 2003/0120510 | A1 | 6/2003 | Panek |
| 2003/0200126 | A1 | 10/2003 | Luh et al. |
| 2005/0099309 | A1 | 5/2005 | Hum et al. |
| 2006/0087432 | A1 | 4/2006 | Corbett |
| 2006/0207850 | A1 | 9/2006 | Lewis |
| 2007/0229272 | A1 | 10/2007 | Cash et al. |
| 2008/0201244 | A1 | 8/2008 | Johnson |
| 2008/0204233 | A1 | 8/2008 | Agrawal et al. |
| 2009/0091453 | A1 | 4/2009 | Ishida et al. |
| 2009/0115572 | A1 | 5/2009 | Valbh et al. |
| 2009/0322486 | A1 | 12/2009 | Gerstel |
| 2010/0174759 | A1 | 7/2010 | Piccinini et al. |
| 2010/0211418 | A1 | 8/2010 | Mateer |
| 2011/0040655 | A1 | 2/2011 | Hendrickson |
| 2011/0040757 | A1 | 2/2011 | Kossi et al. |
| 2012/0190386 | A1* | 7/2012 | Anderson .............. G01C 15/04 455/456.3 |
| 2013/0043080 | A1 | 2/2013 | Kritzler |
| 2013/0218589 | A1 | 8/2013 | Lerner |
| 2013/0221898 | A1 | 8/2013 | Frost |
| 2013/0346255 | A1 | 12/2013 | Hayden et al. |
| 2014/0009291 | A1 | 1/2014 | Requist et al. |
| 2014/0057646 | A1 | 2/2014 | Vaananen |
| 2014/0062700 | A1 | 3/2014 | Heine et al. |
| 2014/0157526 | A1 | 6/2014 | Larmo et al. |
| 2016/0321677 | A1* | 11/2016 | Dobaj .............. G06F 17/30876 |

FOREIGN PATENT DOCUMENTS

| | | |
|---|---|---|
| EP | 1110138 B1 | 5/2003 |
| WO | 00/16189 A1 | 3/2000 |

OTHER PUBLICATIONS

Author Unknown "Your Closet in the Cloud" *Make Space*. Web. Apr. 2015, all pages. <https://www.makespace.com/>.
Lumb, D. "MakeSpace: When Venture Capitalists Go Startup" *Fast Company*. Web. Mar. 2014, all pages. <http://www.fastcolabs.com/3027695/makespace-when-venture-capitalists-go-startup>.
Menton, J. "Your Closet in the Cloud: Will MakeSpace be the Amazon of Physical Storage?" *International Business Times*. Web. May 2014. Retrieved Mar. 2015, all pages. <http://www.ibtimes.com/your-closet-cloud-will-makespace-be-amazon-physical-storage-video-1590735>.
Wikipedia "Luggage Free" *Luggage Forward, Inc.* Web. Mar. 2015, all pages. <http://en.wikipedia.org/wiki/Luggage_Free>.
Wikipedia "Luggage Forward" *Luggage Forward, Inc.* Web. Mar. 2015, all pages. <http://en.wikipedia.org/wiki/Luggage_Forward>.
U.S. Non-Final Office Action dated Mar. 24, 2015 for U.S. Appl. No. 14/583,006, filed Dec. 24, 2014, all pages.
Written Opinion of related International Application No. PCT/US2015/052678 dated Feb. 24, 2016, 26 pages.
International Search Report and Written Opinion of PCT/US2016/060046 dated Feb. 27, 2017, all pages.

* cited by examiner

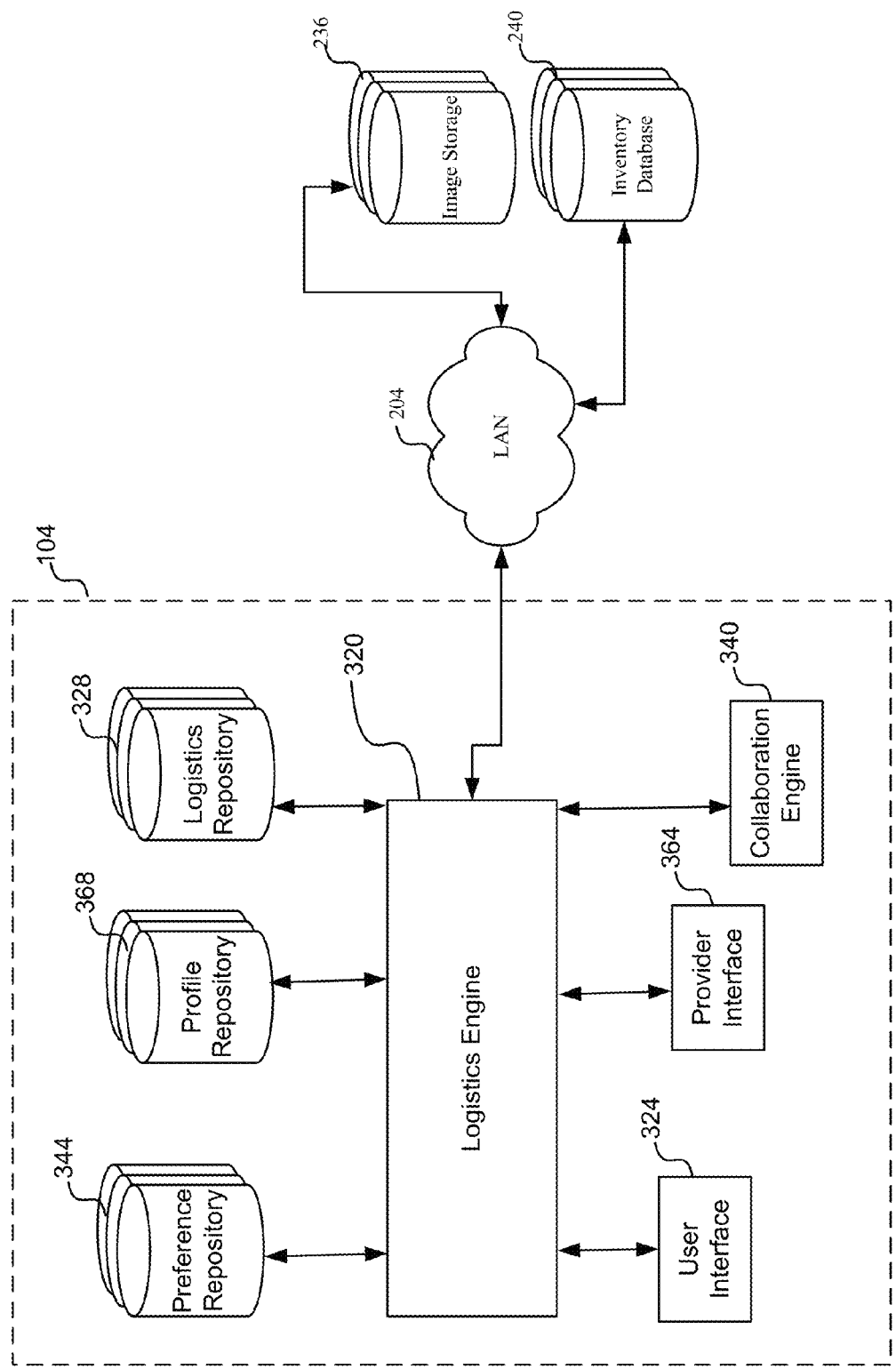

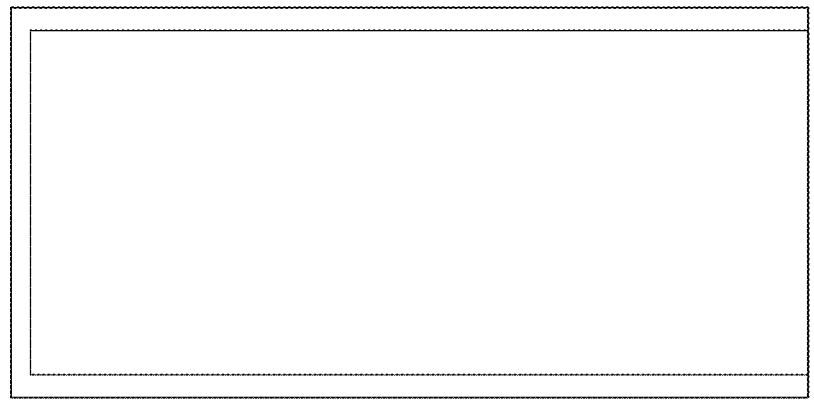
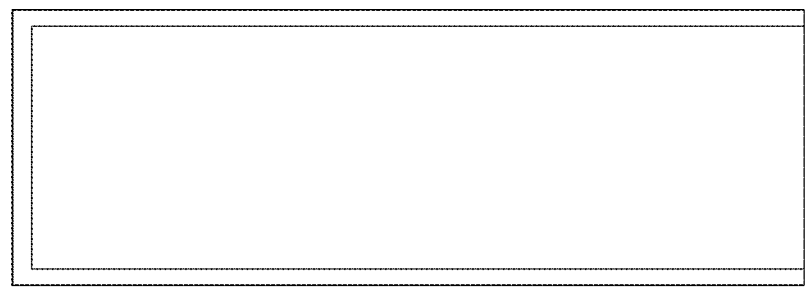
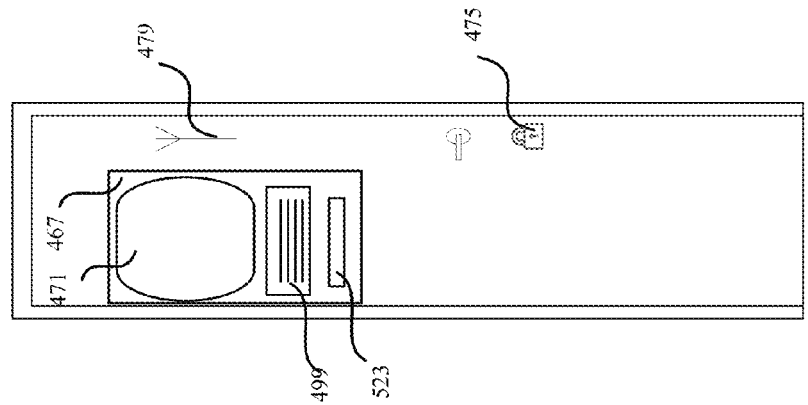

STORAGE CONCIERGE

CROSS-REFERENCE TO RELATED APPLICATIONS

The present application claims priority to U.S. Provisional Application No. 62/249,736, filed Nov. 2, 2015, the disclosure of which is hereby incorporated by reference in its entirety for all purposes. The present application is a continuation-in-part of U.S. Nonprovisional patent application Ser. No. 14/634,369, filed Feb. 27, 2015, entitled "REGISTER FOR COUNTING AND TRACKING OBJECTS IN A BAG" which is a continuation of U.S. Nonprovisional patent application Ser. No. 14/583,006, filed on Dec. 24, 2014, entitled "REGISTER FOR COUNTING AND TRACKING OBJECTS IN A BAG," which claims priority to U.S. Provisional Patent Application No. 62/056,247, filed on Sep. 26, 2014, the disclosures of which are hereby incorporated by reference in their entirety for all purposes.

SUMMARY OF THE INVENTION

A first embodiment of the present invention is a method for operating a storage concierge, the method comprising: assigning a unique address to a user; creating a user account associated with the unique address: associating a first object, wherein the first object was received from the user or a third party provider, with the unique address; associating a first code with the first object and the unique address; associating a first digital image, of the first object, with the first code; storing the first digital image in an image storage; storing a workflow to process the first object; retrieving a workflow at a first time to process the first object; sending a first alert to an operator device that the workflow at the first time is complete; and storing a second digital image, of the first object, in the image storage after the workflow at the first time is complete; and receiving a first request, from a user device associated with the user account, to deliver the first object to a first location at a delivery time. And, in response to the first request: sending a first request to a first shipper to pick up a transitory storage, wherein the transitory storage contains the first object, at a fixed storage location, and deliver the transitory storage to the first location; receiving a first tracking number from the first shipper; sending a first message to the user device, wherein the first message includes the first tracking number and is associated with the user account; receiving a notification from the first shipper that the first object is at the first location; sending a second message to the user device, wherein the second message confirms delivery of the transitory storage at the first location; and receiving a second request, from the user device associated with the user account, to pick up the first object from the first location at a pick-up time. And, in response to the second request: sending a second request to a second shipper to pick up the transitory storage from the first location and return it to the fixed storage location; receiving a second tracking number from the second shipper; sending a third message to the user device, wherein the third message includes the second tracking number; receiving a notification from the second shipper that the transitory storage is at the fixed storage location; sending a fourth message to the user device, wherein the fourth message confirms delivery of the transitory storage at the fixed storage location; storing a third digital image of the first object an image storage; retrieving the workflow at a second time to process the first object; sending a second alert to the operator device that the workflow at the second time is complete; and storing a fourth digital image of the first object in the user account after the workflow at the second time is complete. A variation of the method for operating a storage concierge of claim 1, is wherein: the delivery time is the next day; and the first shipper delivers the transitory storage to the first location by expedited delivery. A further variant of the method is wherein the transitory storage is sized to fit the first object. Yet another variant of the method is further comprising: determining the transitory storage will not arrive at the first location by the delivery time; and sending a failure alert to the operator device. And a further variant is wherein the operator device runs a first application and the user device runs a second application, and wherein the first application is different from the second application. Yet a further variance of the method further comprises sending a third alert, wherein the third alert indicates the workflow is complete, after the workflow is complete at the first time and/or after the workflow is complete at the second time. Another variant of the method is wherein the first code is a bar code, a QR code, or a radio frequency identification tag.

A second embodiment is a system for operating a storage concierge, the system comprising a preference repository configured to store a workflow to process a first object. And the system further comprises a logistics engine configured to: assign a unique address to a user; create a user account associated with the unique address; associate the first object, wherein the first object was received from the user or a third party provider, with the unique address; associate a first code with the first object and the unique address; associate a first digital image, of the first object, with the first code; retrieve a workflow at a first time to process the first object; send a first alert to an operator device that the workflow at the first time is complete; and receive a first request, from a user device associated with the user account, to deliver the first object to a first location at a delivery time. The system is further configured to: send a first request to a first shipper to pick up a transitory storage wherein the transitory storage contains the first object, at a fixed storage location, and deliver the transitory storage to the first location; receive a first tracking number from the first shipper; send a first message to the user device, wherein the first message includes the first tracking number and is associated with the user account; receive a notification from the first shipper that the first object is at the first location; send a second message to the user device, wherein the second message confirms delivery of the transitory storage at the first location; and receive a second request, form the user device associated with the user account, to pick up the first object from the first location at a pick-up time. And the system is further configured to: receive a second tracking number from the second shipper; send a third message to the user device, wherein the third message includes the second tracking number; receive a notification from the second shipper that the transitory storage is at the fixed storage location; send a fourth message to the user device, wherein the fourth message confirms delivery of the transitory storage at the fixed storage location; retrieve a workflow at a second time to process the first object; send a second alert to the operator device that the workflow at the second time is complete. There is further an image storage configured to: store the first digital image of the first object after receiving the first object; store a second digital image of the first object after the workflow at the first time is complete; store a third digital image of the first object after delivery at the fixed storage location; and store a fourth digital image of the first object after the workflow at the second time is complete. A variant of the system is wherein: the delivery time is the next day;

and the first shipper delivers the transitory storage to the first location by expedited. Another variant of the system is wherein the transitory storage is sized to fit the first object. Yet another variant of the system is wherein the transitory storage is sized to fit the first object. And a further variant of the system is wherein the logistics engine is further configured to: determine the transitory storage will not arrive at the first location by the delivery time; and send a failure alert to the operator device. A further variant is wherein the operator device runs a first application and the user device runs a second application, and wherein the first application is different from the second application. And a further variant is wherein the logistics engine is further configured to send a third alert after the workflow is complete at the first time or after the workflow is complete at the second time. And another variant of the system is wherein the first code is a bar code, a QR code, or a radio frequency identification tag.

A third embodiment is a non-transitory computer-readable medium having sets of instructions stored thereon for operating a storage concierge which, when executed by a computer, cause the computer to: assign a unique address to a user; create a user account associated with the unique address: associate a first object, wherein the first object was received from the user or a third party provider, with the unique address; associate a first code with the first object and the unique address; associate a first digital image, of the first object, with the first code; store the first digital image in an image storage; store a workflow to process the first object; retrieve a workflow at a first time to process the first object; send a first alert to an operator device that the workflow at the first time is complete; store a second digital image, of the first object, in the image storage after the workflow at the first time is complete; and receive a first request, from a user device associated with the user account, to deliver the first object to a first location at a delivery time. In response to the first request: send a first request to a first shipper to pick up a transitory storage, wherein the transitory storage contains the first object, at a fixed storage location, and deliver the transitory storage to the first location; receive a first tracking number from the first shipper; send a first message to the user device, wherein the first message includes the first tracking number and is associated with the user account; receive a notification from the first shipper that the first object is at the first location; send a second message to the user device, wherein the second message confirms delivery of the transitory storage at the first location; and receive a second request, from the user device associated with the user account, to pick up the first object from the first location at a pick-up time. In response to the second request: send a second request to a second shipper to pick up the transitory storage from the first location and return it to the fixed storage location; receive a second tracking number from the second shipper; send a third message to the user device, wherein the third message includes the second tracking number; receive a notification from the second shipper that the transitory storage is at the fixed storage location; send a fourth message to the user device, wherein the fourth message confirms delivery of the transitory storage at the fixed storage location; store a third digital image of the first object an image storage; retrieve the workflow at a second time to process the first object; send a second alert to the operator device that the workflow at the second time is complete; and store a fourth digital image of the first object in the user account after the workflow at the second time is complete. Another variant of this embodiment is wherein: the delivery time is the next day; and the first shipper delivers the transitory storage to the first location by expedited delivery. A further variant of this embodiment is wherein the transitory storage is sized to fit the first object. And yet another variant of this embodiment is further comprising: determining the transitory storage will not arrive at the first location by the delivery time; and sending a failure alert to the operator device. And another variant still is wherein the operator device runs a first application and the user device runs a second application, and wherein the first application is different from the second application. And another is wherein the first code is a bar code, a QR code, or a radio frequency identification tag.

BRIEF DESCRIPTION OF THE DRAWINGS

The present disclosure is described in conjunction with the appended figures.

FIG. 3 depicts a block diagram of an embodiment of a logistics server.

FIGS. 5A-C depict a fixed storage device in varying sizes.

FIG. 21 is a flowchart of the concierge fixed storage workflow for locating more efficiently allocating fixed storage in a storage enclosure.

DETAILED DESCRIPTION OF THE INVENTION

Figure 1:
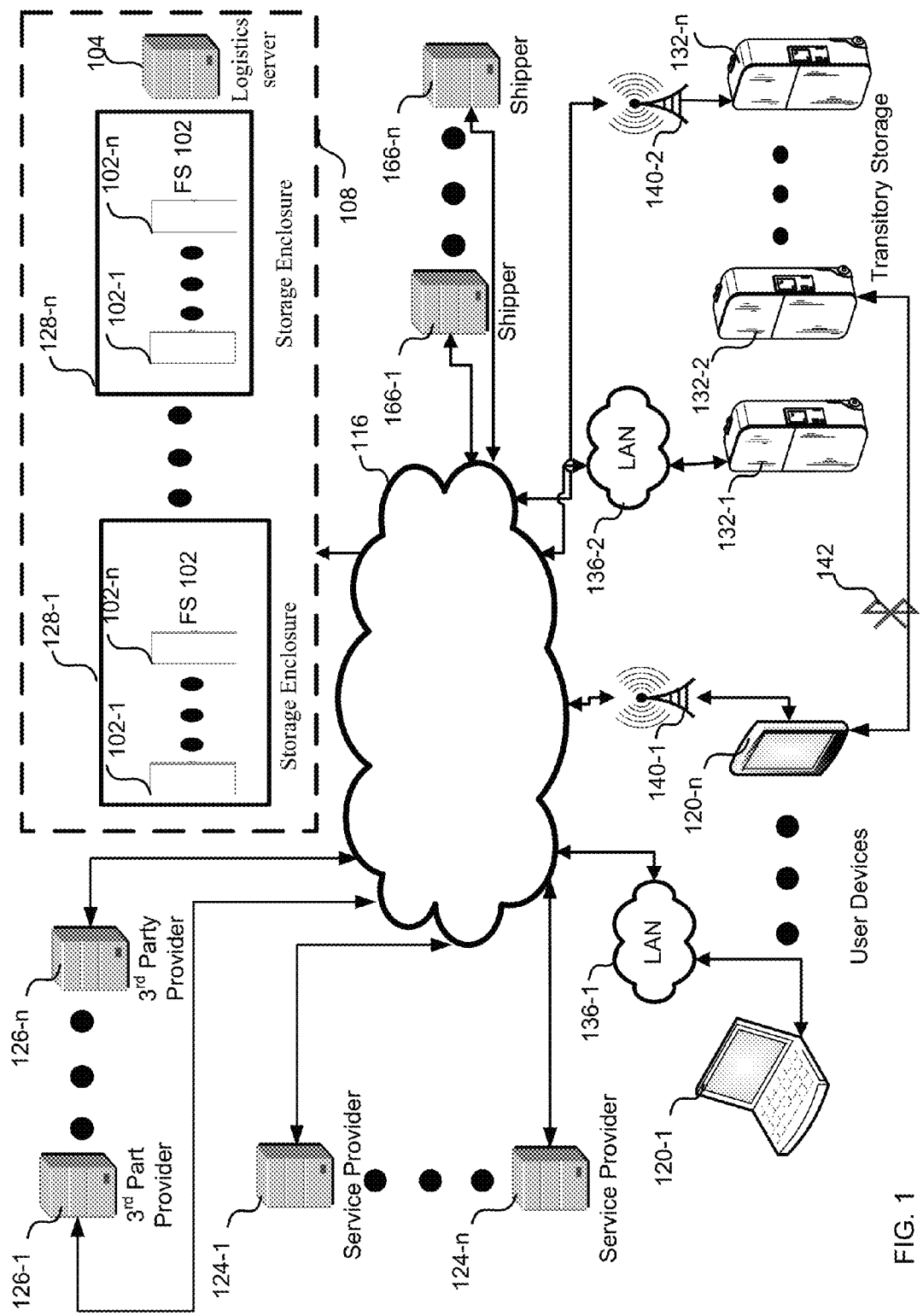
FIG. 1 depicts a block diagram of an embodiment of a storage concierge interacting with processing facilities, fixed storage, transitory storage, user devices, 3rd party providers, shippers, and service providers.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present invention is related to devices, systems, and methods that allow one or more users to store objects, in a fixed storage in a remote storage enclosure, that the user can have shipped to themselves anywhere. More specifically, but without limitation, a user sends objects directly or indirectly from a merchandise provider, to a fixed storage provided by a storage concierge at a Unique Address assigned to the user by the storage concierge. The storage concierge tags each object with an unique code and creates an inventory of each object it receives for the user. The storage concierge processes each object and then stores the objects in the user's fixed storage associated with the Unique Address. When the user needs one or more objects, the user requests the objects to shipped to a desired location. The storage concierge takes the objects from the fixed storage and ships them accordingly. When the user is finished using the objects, the user requests that the objects be returned to the fixed storage. The storage concierge ships the objects to the storage enclosure, processes the objects, and returns them to the fixed storage associated with the users Unique Address. A user may be an individual or any other entity. Objects can be anything from clothing and toiletries to sporting goods such as golf clubs and kayaks, to business goods such as banners, booth set-up materials, and swag.

A user can initiate a storage concierge account in many ways. A user can go online or to a downloaded application and request to become a storage concierge user. The storage concierge will assign the user a Unique Address, and then the user can take one or both of the following actions. First the user can request a welcome kit from the storage concierge. After receiving the kit the user returns the kit with the objects the user wants the storage concierge to store included. Second the user can go to a third party provider and order objects to be delivered to their unique address at the storage concierge. The user could also receive a welcome kit from any one of a number of service providers such as a hotel, shipping service, airline, business services provider, or any provider related to providing goods and services to the user. Once the user receives the welcome kit in this manner they go online or to an application to register the kit and are then assigned a Unique Address. The user can then return the objects it wishes to store in the storage concierge.

FIG. 1 depicts a block diagram of an embodiment of the storage concierge 108 interacting with fixed storage, storage enclosures, transitory storage, user devices, 3rd party providers, and service providers. Logistic servers 104 and storage enclosures 128 are part of a storage concierge 108. The logistics server 104 communicates through internet 116, with user devices 120, service providers 124, 3rd party providers 126, storage enclosures 128, fixed storage 102, and transitory storage 132. The storage concierge 108 coordinates delivery and/or processing of objects in one or more fixed storage 102 102 (referred to as FS 102 in the figures) and/or with one or more transitory storage 132 (referred to as TS 132 in the figures) using shippers 166-1-166-n. The objects a user wants to store in storage concierge range from clothes and toiletries for a trip to sporting equipment like golf clubs and kayaks to business meeting material including banners and swag. The internet 116 transmit data (e.g., data packets) between the logistics server 104, user devices 120, service providers 124, shippers 166, storage enclosures 128, and/or transitory storage 132. Though only one server is shown for the logistics server 104, it is to be understood that one or more logistics servers 104 could be used. Similarly, throughout this description, if one server is depicted and/or discussed, one or more servers could be used.

The storage concierge 108 receives objects from the user and creates an inventory comprising those objects. In some embodiments, the storage concierge 108 takes an image of each object, and includes them in the inventory. The storage concierge 108 associates a Unique Address with each user and associates the user's fixed storage with the Unique Address. The storage concierge 108 associates a unique code to each object and associates the object code with the user's Unique Address. The user may provide processing instructions with each object, the object itself could be labeled with processing instructions, a service provider 124, and/or a merchandise provider 126 can provide processing instructions for each object. Processing instruction comprise, but are not limited to, cleaning, ironing, polishing, storing with opening, and repairing the object. In some embodiments the storage concierge 108 associates the object's processing instructions with the unique code in the inventory. The storage concierge 108 places the objects in the fixed storage 102 associated with the user's Unique Address in the storage enclosure 128. The storage concierge 108 offers fixed storage 102 in various sizes. In some embodiments the storage concierge 108 moves objects from one size fixed storage 102 to another sized fixed storage 102 if the objects in the fixed storage 102 do not fit. In some embodiments, storage enclosures 128 are geographically spread to reduce shipment costs and/or facility costs. In some embodiments the storage concierge 108 determines that particular users fixed storage 102 contents should be moved to a different fixed storage 102 in a different geographic area for cost, efficiency, or other purposes. A user uses a user device 120 (e.g., desktop, laptop, tablet, and/or mobile device such as a smart phone) to request the storage concierge 108 process particular objects from the fixed storage 102 and place those objects in a transitory storage 132. In some embodiments the storage concierge 108 provides transitory storage 132 in varying sizes. In some embodiments the storage concierge 108 places the objects in the appropriate sized transitory storage 132 before shipping them. In other embodiments the user provides their own transitory storage 132. The user request includes a request that the storage concierge 108 arrange to deliver the transitory storage 132 at a particular destination at a particular date and time. The storage concierge 108 provides the user updates on processing, shipping, and delivering the transitory storage over the internet 116 to the user device 120. In some embodiments, a user device 120 is connected by a local area network (LAN) to the internet 116 (e.g., a first user device 120-1 connected to a first LAN 136-1). In some embodiments, a user device 120 is connected to the Internet 116 by a cell tower 140 (e.g., an nth user device 120-n connected to a first cell tower 140-1). In other embodiments the user device 120 can communicate directly with the transitory storage 132 using a local connection such as a Bluetooth connection 142. It should be noted that the user device 120 can communicate with fixed storage 102 in the same manner as described here for the user device 120 communicating with the transitory storage 132.

The storage concierge 108 uses service providers 124 to process objects in the fixed storage 102 (e.g., cleaning and/or repairing) and/or to deliver the transitory storage 132 (e.g., a courier service, a package delivery service, and/or an airline). The user uses 3rd party providers 126 to purchase objects and have them shipped to their Unique Address to be placed in their fixed storage 102 in some embodiments. For instance, the user notices that he/she is running out of deodorant and so orders deodorant to be shipped to their Unique Address for delivery to their fixed storage 102 by a merchandise provider 126. Users and the storage concierge 108 communicate with the service providers 124 and the 3rd party providers 126 over the Internet 116 over any type of connection such as wired internet, cellular internet, Bluetooth, and/or all other types of networks including POTS.

Figure 2:
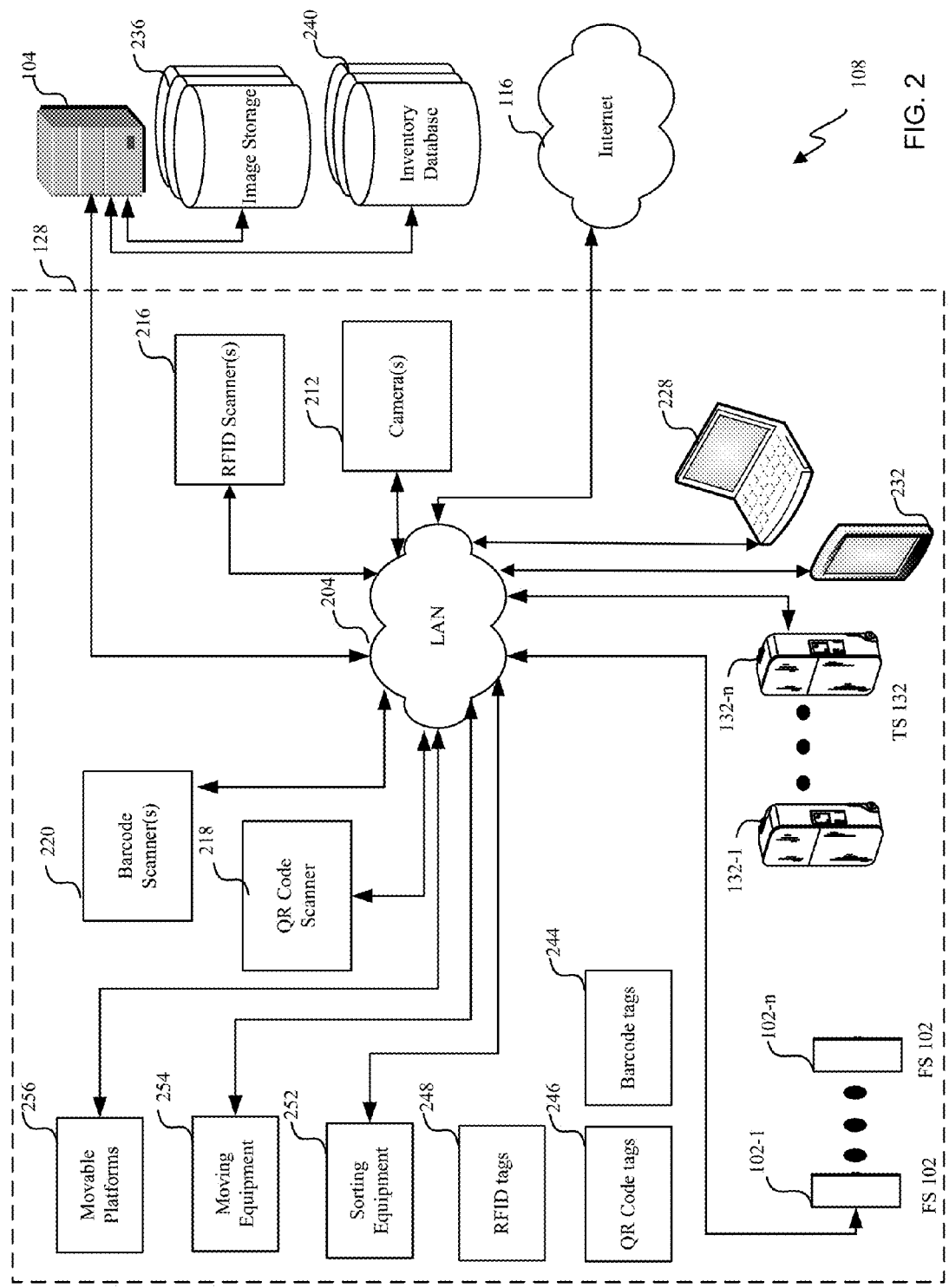
FIG. 2 depicts a block diagram of an embodiment of a storage concierge.

In most embodiments transitory storage 132 comprises no electronic display, communication, or locking devices. In other embodiments, the transitory storage 132 communicates with the logistics server 104 (e.g., through a modem). The logistics server 104 receives information from the transitory storage 132 (e.g., GPS data, inventory, etc.), and/or provides instructions to the transitory storage 132 (e.g., for the transitory storage 132 to display a mailing label on a screen or to unlock). In some embodiments, the transitory storage 132 is connected by a LAN 136 to the Internet 116 (e.g., a first transitory storage 132-1 connected to a second LAN 136-2). In some embodiments, a transitory storage 132 is connected to the Internet 116 by a cell tower 140 (e.g., an nth transitory storage 132-n connected to a second cell tower 140-2). In some embodiments the transitory storage 132-2 communicates directly with user device 120-n using the Bluetooth 142 connection or other local peer to peer type network. It is understood that fixed storage 102 can communicate with the logistics server 104 in the same manner in some embodiments FIG. 2 depicts a block diagram of the storage concierge 108. The storage concierge 108 comprises a storage enclosure 128 connected to the internet 116 and to the logistics server 104. The storage enclosure 128 comprises a local area network (LAN) 204 connected to the internet 116. Connected to the LAN 204 are one or more cameras 212, one or more RFID scanners 216, one or more barcode scanners 220, one or more QR code scanners 218, one or computers 228, and/or one or more operator devices 232 (e.g., desktop, laptop, tablet, and/or mobile device such as a smart phone). The storage enclosure further comprises transitory storage 132 connected to LAN 204 and fixed storage 102 connected to the LAN 204, RFID/Code tags 248, sorting equipment 252, moving equipment 254, and movable platforms 256. Although not shown, transitory storage 132 can communicate to operator device 232 via Bluetooth connection 142 in some embodiments. In some embodiments the fixed storage 102 can communicate with the operator device 232 via Bluetooth connection 142. In some embodiments all devices in storage enclosure 128 can communicate with all other devices via Bluetooth connection 142 or over other peer to peer networks. In yet most embodiments, transitory storage 132 and fixed storage 102 have no communications components.

The logistics server 104 is connected to an image storage 236 and an inventory database 240 either directly and/or through LAN 204. The logistics server 104, the image storage 236, and/or the inventory database 240 can be located physically in storage enclosure 128 in some embodiments, but can also be located in the cloud connected to the storage enclosure 128 by internet 116 in other embodiments.

Initially a user sends objects to the storage concierge 108. The storage concierge 108 uses camera 212 to take pictures of the objects to create an inventory of the fixed storage 102 associated with the user's Unique Address. The storage concierge 108 associates RFID tags 248, QR code tags 246, and/or Barcode tags 244 to objects. The storage concierge 108 uses RFID scanner 216, QR Code scanner 218, and/or barcode scanner 220 to read the RFID tags 248, QR Code tags 246, and/or Barcode tags 244 to add objects to the inventory for the fixed storage 102. In some embodiments the storage concierge 108 uses RFID tags 248 instead of barcodes so that multiple RFID tags 248 can be read at once, speeding up the inventory process. Pictures of objects of the fixed storage 102 are stored in the image storage 236. The storage concierge 108 stores the fixed storage 102 inventory in the inventory database 240. In some embodiments, the storage concierge uses the operator device 232 to perform functions of the camera(s) 212, RFID scanner(s) 216, QR Code scanner 218, and/or barcode scanner(s) 220. The storage concierge 108 places the objects in the fixed storage 102 associated with the user's Unique Address. When the user wants objects delivered he/she uses user device 120 to request which objects he/she wants, where the objects should be shipped, and what date and time the objects must arrive by. The storage concierge 108 will locate the fixed storage 102 associated with the user's Unique Address and initiate removal of each object requested, create a manifest of the objects, initiate placement in the transitory storage 132, and ship them to the requested location at the requested time using a shipper 166. When the user is done with the object, he/she uses user device 120 to request that the storage concierge 108 return the objects to the fixed storage 102. The storage concierge 108 uses the shipper 166 to return the objects to the storage enclosure 128. The storage concierge 108 scans the objects using RFID scanner 216, QR code scanner 218, and/or barcode scanner 220.

In some embodiments, sorting equipment 252 is used to sort transitory storage 132 going to different locations and/or sorting objects for fixed storage 102 (e.g., sending and receiving objects for multiple transitory storage 132 to and from the service provider 124). The storage concierge 108 uses moving equipment 254 to move objects, transitory storage 132, and fixed storage 102 in some embodiments. In other embodiments the storage concierge moves objects, transitory storage 132, and fixed storage on movable platforms 256. An example of a movable platform 256 is one that rotates around the storage enclosure 128 to facilitate automatic placement and removal of objects in fixed storage 102 and transitory storage 132.

Referring next to FIG. 3, a block diagram of a logistics server 104, connected to image storage 236 and inventory database 240 via LAN 240. Although shown separately from the logistics server 104 here, one of skill in the art will recognize that image storage 236 and inventory database 240 could be part of logistics server 104 and/or alternatively connected by internet 116.

The logistics server 104 comprises a logistics engine 320, a user interface 324, and a logistics repository 328, and other components discussed herein. Through the user interface 324, the user is able to request the storage concierge 108 to place objects from the fixed storage 102 associated with their Unique Address into the transitory storage 132 be delivered to a destination. In some embodiments the user provides a sequence or partial sequence of destinations, an itinerary, a partial destination such as a city but not a specific location within the city, or other destination-related information. In some embodiments the user changes previously provided destination-related information, and optionally is able to change all previously-provided destination-related information or only some; for example, previously-provided destination-related information that cannot be changed may appear grayed-out or is otherwise indicated to the user. The logistics engine 320 communicates with the storage enclosure 128 and one or more package-delivery services 166 to deliver the transitory storage 132 from the storage enclosure 128 to the destination. Information about routing and deliveries is stored in the logistics repository 328. The storage concierge 108 uses the user interface 324 to notify users of events associated with objects in their fixed storage 102 and/or transitory storage 132. The storage concierge 108 notifies the user that objects are received, processed, and placed into fixed storage 102. It can also notify the user that object from fixed storage 102 are placed into the transitory storage 132 to be shipped. It notifies the user when an object is missing in the transitory storage 132 when it is returned. The concierge fixed storage 108 also notifies the user when the transitory storage 132 is shipped, delivered, and/or returned to storage enclosure 128. The storage concierge 108 offers options to users on the user device 120 such as changing the delivery location, date, or time. In short, using the user interface 324, the storage concierge 108 communicates with the user about virtually anything related to the user's objects, fixed storage 102, storage enclosure 128, objects in transit, objects returned, how they are processed, etc.

A collaboration engine 340 is also part of logistics server 104 along with a preference repository 344. One of skill in the art will recognize that collaboration engine 340 could be part of logistics engine 320 or that all or part of the functions of collaboration engine 340 could be performed by logistics engine 320. The collaboration engine 340 works with service providers 124 to provide the user with assistance when traveling. Some examples of service providers 124 include social media providers, weather websites, travel advisory websites, hotels, and transportation providers (e.g., taxi, bus, and subways). For example, the collaboration engine 340 checks a weather report when the user is to be in New York City and identifies a more than 50% likelihood of rain. The collaboration engine 340 identifies that an umbrella is not listed on an inventory list of the transitory storage 132. The collaboration engine 340 notifies the user through the user interface 324, and the user is given an option to have an umbrella placed in the transitory storage 132 when it is packed at the storage enclosure. Alternatively, an umbrella is automatically placed in the transitory storage 132. Or the hotel staff at the New York Hotel are notified and the hotel staff offer the user an umbrella.

In some embodiments, the collaboration engine 340 links information from the logistics server 104 to social media accounts. For example, the user could be notified that certain contacts from a LinkedIn account may also be in New York City during the first trip. The user may also be given dress recommendations for events the user is attending in New York City. The inventory list could be shared with friends. Further, preferred accounts (e.g., frequent flyer accounts and preferred guest accounts for hotels) can be consolidated and preferred businesses used.

In another embodiment, the collaboration engine 340 works with 3rd party providers 126 to allow the user to order objects from a merchandise provider 126 and have them delivered to their fixed storage 102 using the user's Unique Address. The storage concierge 108 assigns each user a Unique Address that associates the user to the fixed storage 102. For instance, if the user realizes that the destination they would like to have objects from their fixed storage delivered to is undergoing heavy storms and bad weather, the user, using a user device 120 can order an umbrellas and other bad weather clothing from a merchandise provider 126 and designate their Unique Address as the ship to address. The merchandise provider 126 ships the merchandise to the Unique Address care of the storage concierge 108. The storage concierge 108 processes the merchandise and places it in the user's fixed storage 102 associated with that Unique Address. The user is then able to request the objects be shipped in transitory storage 132.

The logistics server 104 further comprises a provider interface 364, and a profile repository 368. The provider interface 364 communicates with the provider devices 360 (not shown). Provider devices include desktop, laptop, tablet, and/or mobile device such as a smart phone devices. The provider interface 364 allows the provider device 360 to interact with the transitory storage 132 and the fixed storage 102 in some embodiments.

In some embodiments, information from provider devices 360 is accessed through the provider interface 364, which accesses available application programming interfaces at and/or through the provider devices 360, and communicates the information from the provider devices to subsystems of the logistics server 104, such as the logistics engine 320, user interface 324, and/or logistics repository 328. The provider interface 364, as appropriate, enables the logistics server 104, and/or subsystems of the logistics server 104, to monitor and report location information and/or progress information of the transitory storage 132; to modify elements of a route of the transitory storage 132, if requested and/or if necessary; to communicate to other provider devices 360; and/or to manage service providers, as appropriate.

For example, the user device 120 has the same or different version of a mobile application (i.e., mobile app); a hotel staff member has the same or different version of the mobile application on an iPad; and a dry cleaner has the same or different version of the mobile application on an iPad. Profiles of the user, the hotel staff member, and the dry cleaner are stored in the profile repository 368. The user, the hotel staff member, and the dry cleaner are each permitted different information and access to the transitory storage 132 based on the same or different version of the mobile application and/or a profile. For example, the user is allowed to select locations to send the transitory storage 132 and unlock the transitory storage 132. A bellhop is able to scan a 2-D barcode on the screen 470 and determine a room number to place the transitory storage 132 in, without necessarily learning an identification of the user. The bellhop is also able to provide status updates and schedule pick up of the transitory storage 132 by a shipper 166. The dry cleaner is able to unlock the transitory storage 132 and provide status updates. In some embodiments, requests for action or information are authenticated. As another example the user uses the user device 120 to interact with a merchandise provider 126 to order an object to be delivered to the storage concierge 108 at the Unique Address.

In some embodiments, the provider interface 364 also interfaces with provider devices 360 to authenticate or otherwise authorize provider personnel. For example, provider personnel may use a smartphone interface to send and receive information to and from the logistics server 104, and/or subsystems of the logistics server 104, such as scanning a transitory storage 132 or indicating a location change for a transitory storage 132. The provider personnel smartphone interface software may be freely downloadable from a smartphone manufacturer app store or other app store; after downloading the provider personnel smartphone interface software, an employee of, or contractor working for, the service provider can enter credentials of the provider personnel, such as employee number, email address, and/or password into the provider personnel smartphone interface software. The smartphone interface software in turn can authenticate the provider personnel directly (e.g., on a system device of the provider) and/or via the provider interface 364. In some embodiments, authentication includes employing federated electronic identity technologies such as OAuth, OpenID, Liberty ID, single sign-on, SAML, and/or another federated electronic identity technology. If the service provider 124 does not have systems supporting federated electronic identity, the provider management module 366 can directly support provider personnel enrollment, verification, credential management (e.g., user ID, password, biometric data, and/or other credentials), and/or user authentication. The provider personnel smartphone interface software may provide support for scanning the dynamic display 412 using a built-in camera or may support identifying, or optionally communicating with, the transitory storage 132 using one or more communication protocols, such as NFC, Bluetooth, Wi-Fi Direct, and/or other device-to-device direct communication protocol.

In some embodiments the storage concierge 108 provides the same app for all interfaces while in other embodiments, one application is divided into different mobile apps for different functionality and/or users. For example, there is a user app for the user, a first service app for a first type of service provider (e.g., for hotel staff), a second service app for a second type of service provider (e.g., for dry cleaners), etc. Thus the user app could track one or more transitory storage 132 belonging to, or associated with, the user, and the first service app could track multiple transitory storage 132 under control of the service provider (e.g., all transitory storage 132 in the hotel). But the different apps are all communicating with a single, integrated cloud-based system (e.g., logistics server 104). Furthermore, additional apps can be made for additional functions. For example, in some embodiments, an assistant app is used by an assistant to track one or more boss' bag(s) 132. The assistant could work for a first boss and a second boss. The assistant app could link together transitory storage 132 information for the first boss and the second boss. The assistant, based on permissions granted, could then perform tasks such as track transitory storage 132 132, schedule replacement contents, schedule delivery, etc. It is appreciated that the aforementioned different apps can all be combined as one app with different authorizations and permissions for each app user.

Further, more than one transitory storage 132 can be used for a trip, but have different handling/delivery details. For example, the user could have a first transitory storage 132, containing clothes, delivered to a hotel in a city; and a second transitory storage 132, containing presentation/demo equipment, to be delivered to a trunk of a rental car in the city. When the user arrives by air to the city, the user rents the rental car. The user then travels in the rental car to an office to give a presentation. After the presentation, the user goes to the hotel in the city. In this example, the user does not need to travel with the first transitory storage 132 to the office to give the presentation.

Figure 4C:
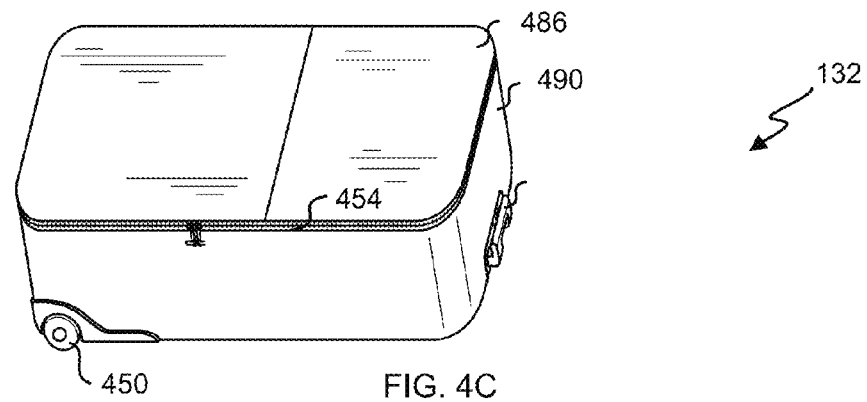
FIGS. 4A-C depict a transitory storage device in varying sizes.
Figure 4B:
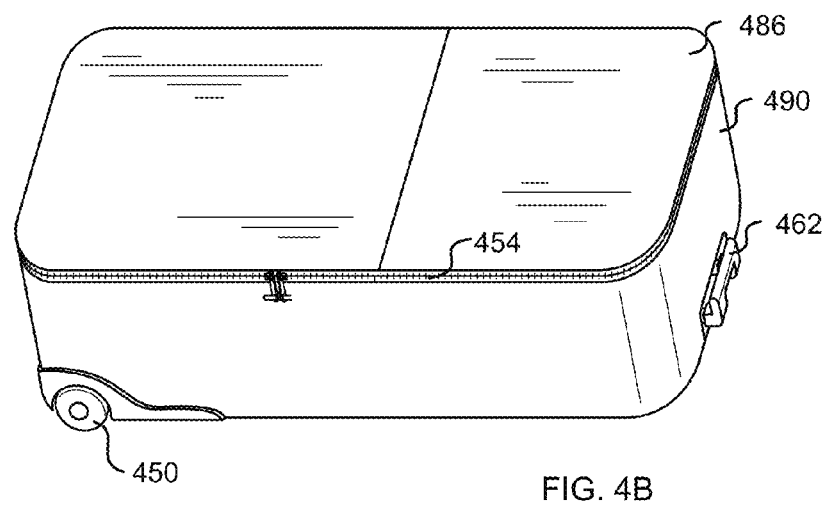
Figure 4A:
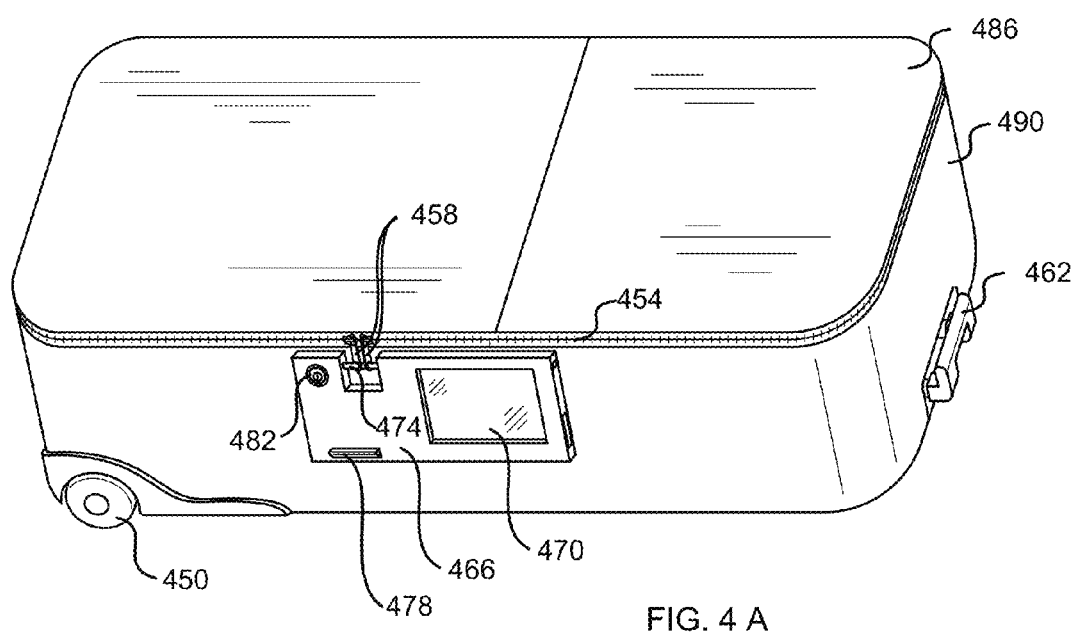

Referring to FIG. 4A, is a simplified diagram of an of the embodiments of the transitory storage 132 is depicted. The transitory storage 132 is basically rectangular in shape and comprises wheels 450, a zipper 454 with two zipper pulls 458, and a handle 462 for pulling the transitory storage 132. In some embodiments, the transitory storage 132 is sized as a carry on for air travel (e.g., less than 45 linear inches/114 linear cm; or less than 22×14×9 inches/56×35×23 cm). In some embodiments, the transitory storage 132 is a fold-over transitory storage for transporting a suit. Other forms of transitory storage 132 will be apparent to a person of ordinary skill in the art. In this disclosure, a piece of transitory storage 132 is considered a bag or luggage. A transitory storage is a portable container for carrying objects. Though this disclosure discusses transitory storage, similar processes can be used for other types of transitory storage. The transitory storage 132 can, but does not have to, further comprise a console 466. The console, in this embodiment, is shown having a screen 470, a locking mechanism 474, and an antenna 478. In some embodiments, the screen 470 is an electronic screen. The console 466 further comprises a processor, which can function as the transitory storage engine 404, and transitory storage memory 408. The zipper pulls 458 are secured by the locking mechanism 474 in a position to secure the transitory storage 132 in a closed position (e.g., zipper 454 secures a lid 486 to a bin portion 490 of the transitory storage 132). In some embodiments, the antenna 478 is internal to the console 466. In some embodiments, the antenna 478 receives a signal to unlock the locking mechanism 474 and an actuator in the console 466 unlocks the locking mechanism 474. The console 466 further comprises a mechanical-access lock 482. In some embodiments, the screen 470 is used to display routing information, such as a parcel label for shipping through a parcel service, instructions for handling and/or processing, and/or instructions for the user. One of skill in the art will recognize that transitory storage 132 may have as many or as few of the features discussed above, and in most cases may not have any electronics at all. FIG. 4A depicts a large transitory storage 132. FIGS. 4B and 4C show a medium and small transitory storage 132 respectively. One of skill in the art will recognize that a user needs a small transitory storage 132 for shorter trips, but might need a larger transitory storage 132 for longer trips. The size of transitory storage 132 is determined by the storage concierge 108 based on the total volume of objects selected by the user, shape of the objects selected by the user, number of objects selected, by the user, and other parameters. FIGS. 4B and 4C also depict transitory storage 132 without the display 470 and associated other electronic components.

Referring to FIG. 5A, a simplified diagram of an embodiment of the fixed storage 102 is depicted. The fixed storage 102 can be a closet or locker or any other type of permanent storage. The fixed storage 102 can further comprises a console 467. In many embodiments the fixed storage 102 will not have a console. The console, in this embodiment, is shown having a screen 471, a locking mechanism 475, and an antenna 479. In some embodiments, the screen 471 is an electronic screen. The console 467 further comprises a processor, which can function as the fixed storage engine 404, and fixed storage memory 408. The fixed storage 102 is secured by the locking mechanism 475 in a position to secure the fixed storage 102 in a closed position. In some embodiments, the antenna 478 is internal to the console 466. In some embodiments, the antenna 479 receives a signal to unlock the locking mechanism 475 and an actuator in the console 467 unlocks the locking mechanism 475 that a regular key can also unlock. The console 467 further comprises a keyboard 499. The port 523 provides a wired port to the modem 416. One of ordinary skill in the art will recognize that fixed storage 102 (referred to as FS 102 in the figures) takes different forms in different embodiments and may comprise as many or as few of the discussed components. FIG. 5A depicts a small fixed storage 102. FIGS. 5B and 5C depict a medium sized and larger sized fixed storage 102. The storage concierge 108 determines the size of fixed storage 102 required for each user based on the volume of objects the user desires to store. In some embodiments, the user adds objects over time and can require a larger fixed storage 102. FIGS. 5B and 5C also depict fixed storage 102 without display 471 and other electronic components. In some embodiments storage 102 is a linear space delimited by dividers wherein the dividers allocate small, medium, and larger spaces depending on the size space needed by a user.

Figure 6:
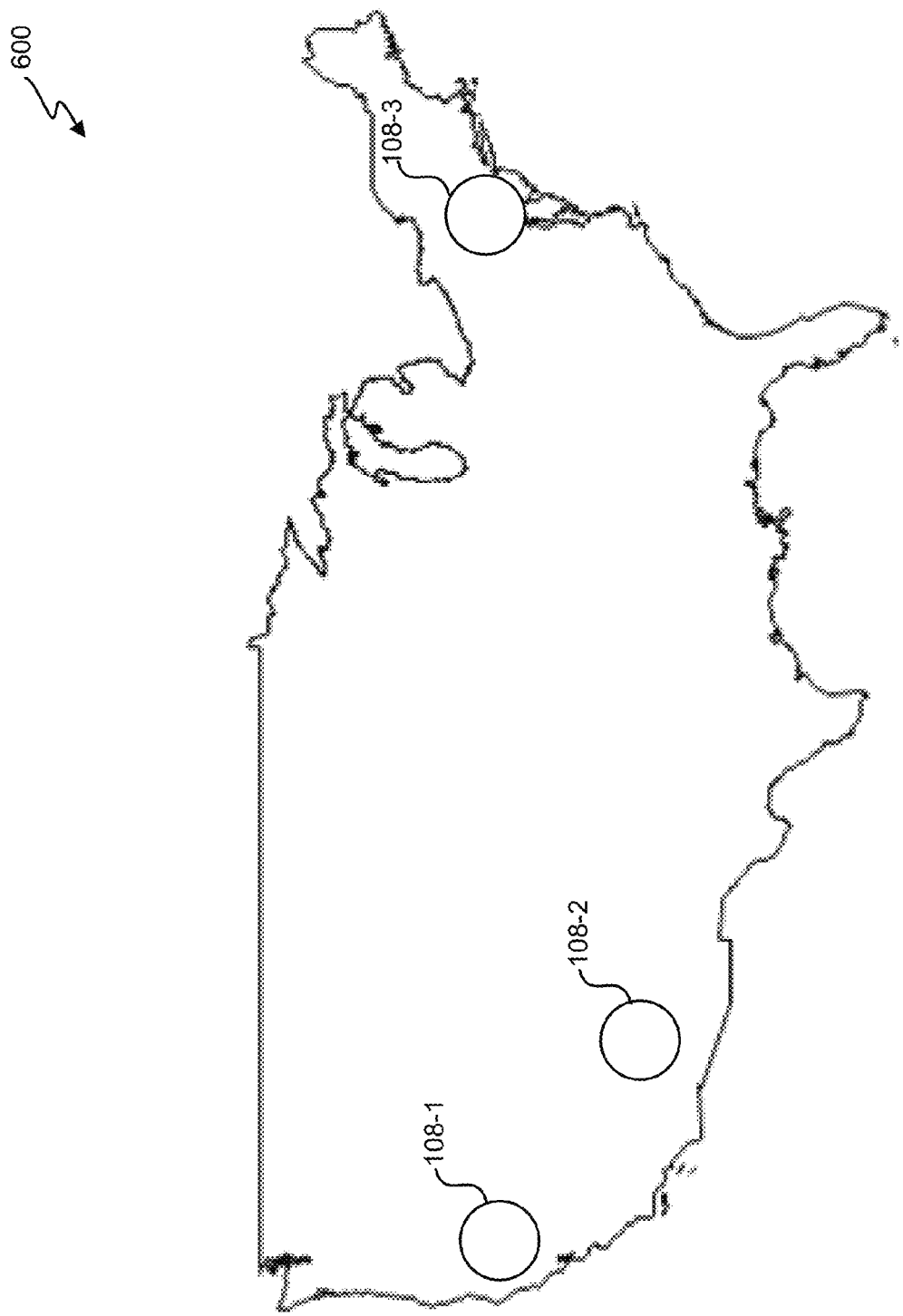
FIG. 6 depicts a storage enclosure location map.

Shown in FIG. 6, map 600 is an example of locations of storage enclosures 128-1 to 128-3. Storage enclosures 128 can be warehouses but can also be any other enclosure equipped to house fixed storage 102. While FIG. 6 depicts three storage enclosures 128-1 to 128-3 located in three different locations, West Coast, USA, Central, USA, and East Coast, USA—embodiments are not so limited. One of skill in the art will recognize that storage enclosures 128 may be advantageously placed at locations around the world. Typically the storage enclosure 128 for a user's fixed storage 102 will be determined to be the one most proximate to an area most frequently traveled to by the user. In other embodiments, it may be advantageous for the user to have a fixed storage 102 in more than one storage enclosures 128. In other embodiments it may be advantageous to move a user's fixed storage 102 from one storage enclosure 128 to another storage enclosure 128 as the user's travel patterns change over time.

Figure 7:
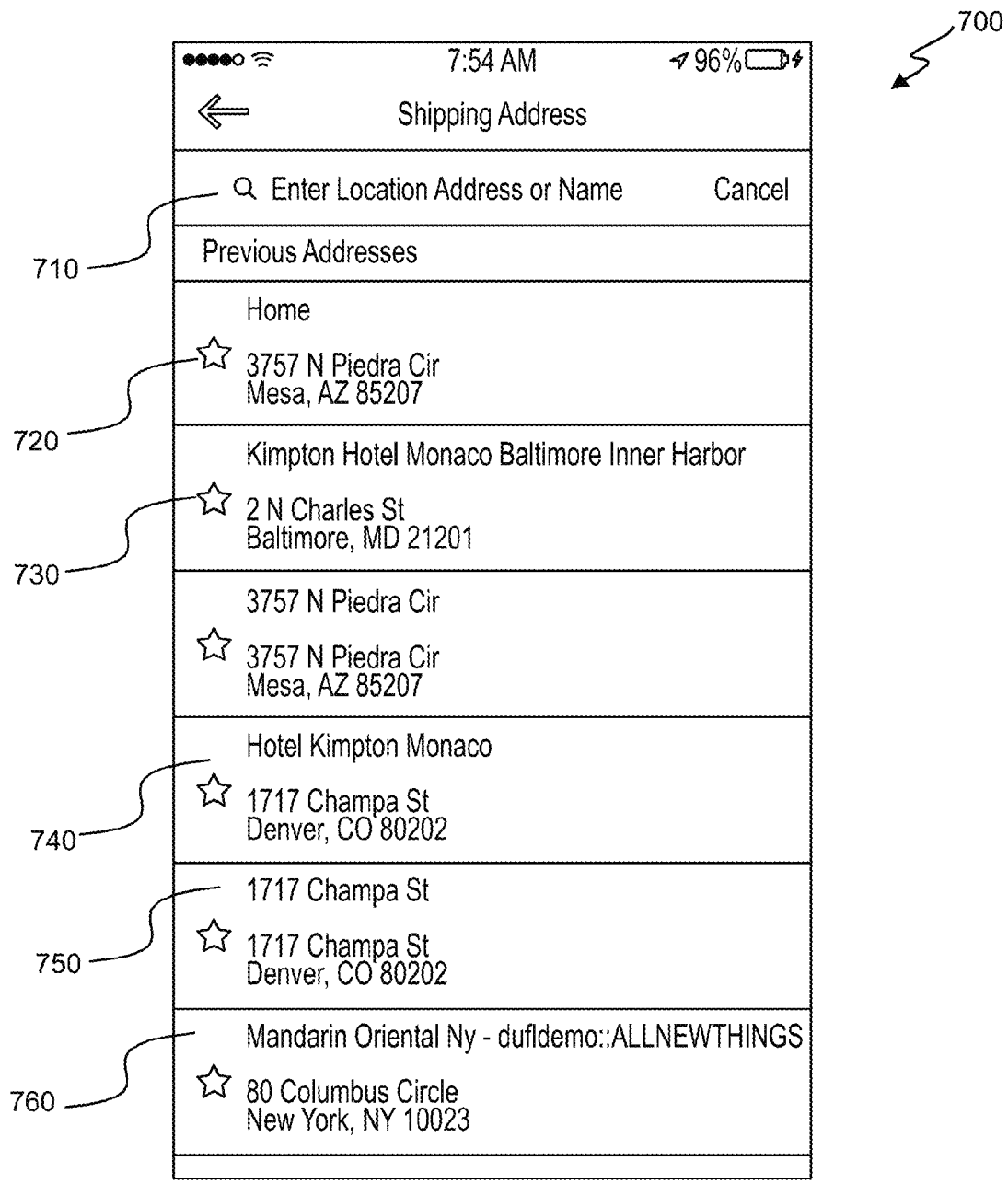
FIG. 7 depicts a screen shot of selecting a shipping address.

FIG. 7 shows a example screen shot 700 that appears on the user application when selecting the "Schedule Trip" button of the application. Screen shot 700 requests a location at the top at 710. If the user has requested shipment in the past, however, the recent requested trip locations are shown as convenience buttons so that the user merely selects one and doesn't have to enter an address. Home is shown at 720, a hotel is shown at 730, another hotel is shown at 740 an address is shown at 750 and yet another address is shown at 760. Once an address is entered and the delivery time and other details are entered, the contents of the user's fixed storage 102 appears in screenshot 800 of FIG. 8. From example screenshot 800, the user selects the objects the user wants shipped in transitory storage 132 by pressing on the picture of each object the user wants. The storage concierge 108 initiates the processing and shipping of the objects from the fixed storage 102 in the transitory storage 132 to the first location. Each of items 805, 810, 815, 820, 830, 840, 850, 860, 870, 880, 890, and 895 can be selected to be included in transitory storage 132 for shipment to a first location. The user can also select "Add Items" at 825 to add more items.

Figure 8:
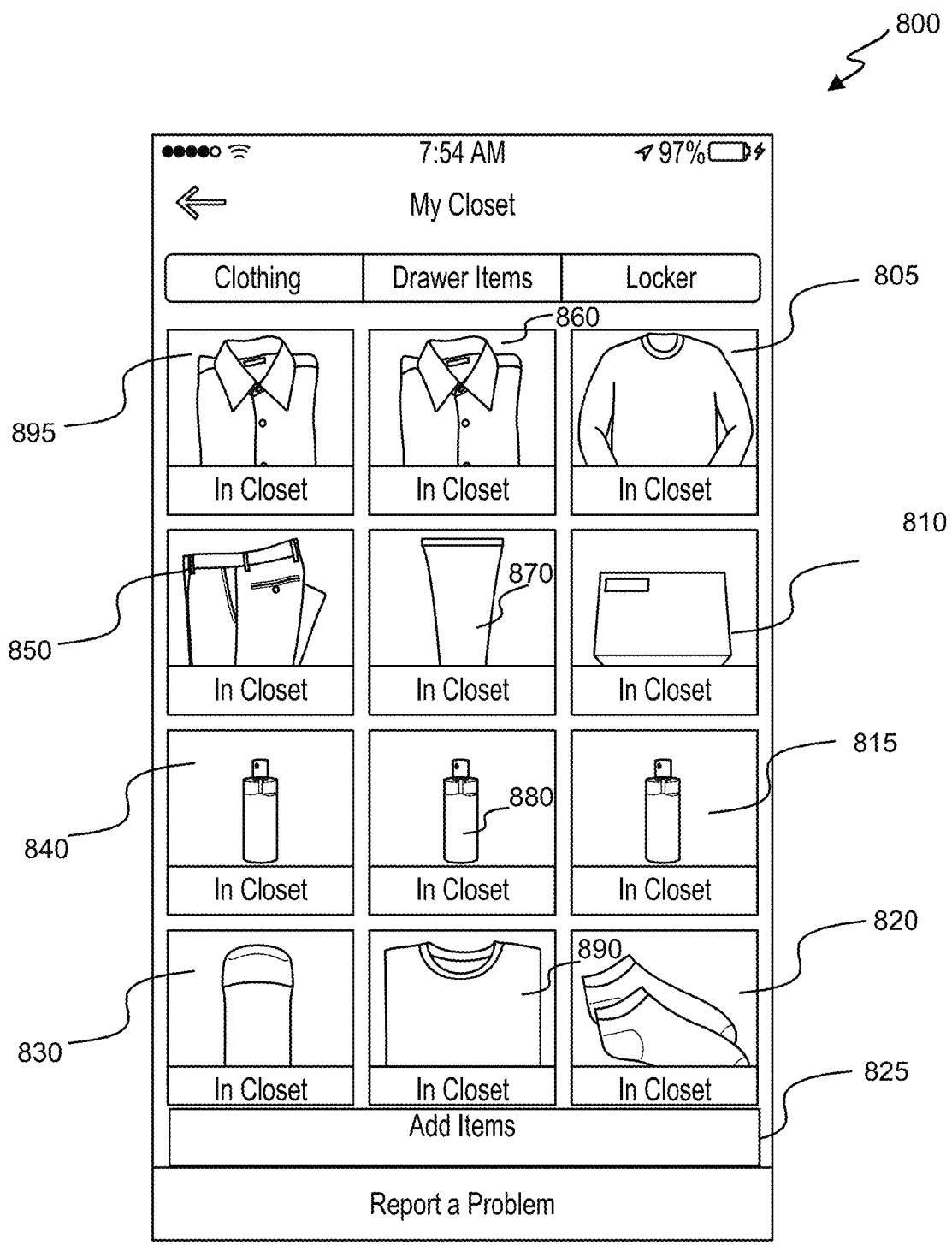
FIG. 8 depicts a screen shot of selecting objects to be shipped.
Figure 9:
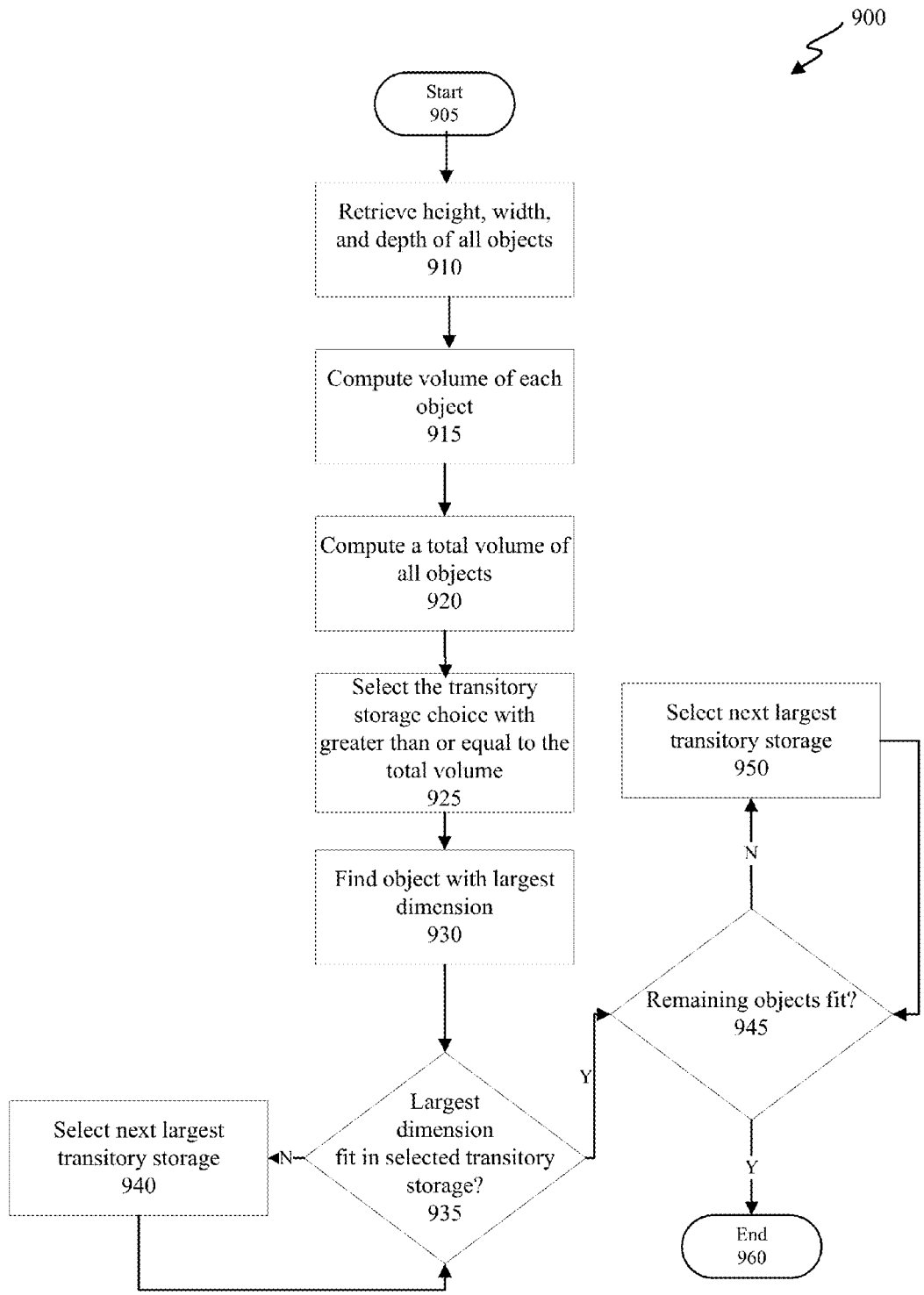
FIG. 9 is flowchart of an embodiment of a method to add object to a transitory storage.

In FIG. 9, is a flowchart 900 of one embodiment of placing the objects selected in FIG. 8 in the transitory storage 132. Starting at block 905 and moving to block 910 where the logistics engine retrieves the height, width, and depth of each object. Next at block 915 the logistics engine computes the volume of each objects. At block 920 the logistics engine 320 computes the total value of all of the objects. At block 925 the logistics engine 320 selects the first transitory storage 132 that has greater than or equal to the total volume of all objects. At the next block 930, the logistics engine 320 determines which object has the biggest dimension. And at block 935 the logistics engine 320 determines if the object that has the biggest dimension has a larger dimension than the first transitory storage 132. If it does not—then at block 940 the second transitory storage 132 is selected by the logistics engine 320. And again at block 935 the process is repeated until a large enough transitory storage 132 is selected that is at least as large in one dimension as the object with the biggest dimension. Next at block 945 the logistics engine 320 determine if the remaining object s fit into the large enough transitory storage 132. If all objects fit then the process is at an end at block 960. If the remaining objects do not fit—then a block 950 the next biggest transitory storage 132 and block 945 is repeated until all objects fit. This in only one embodiment of fitting objects into transitory storage 132. One of skill in the art will appreciate that there are many other methods of computing how to fit objects into a storage.

Figure 10:
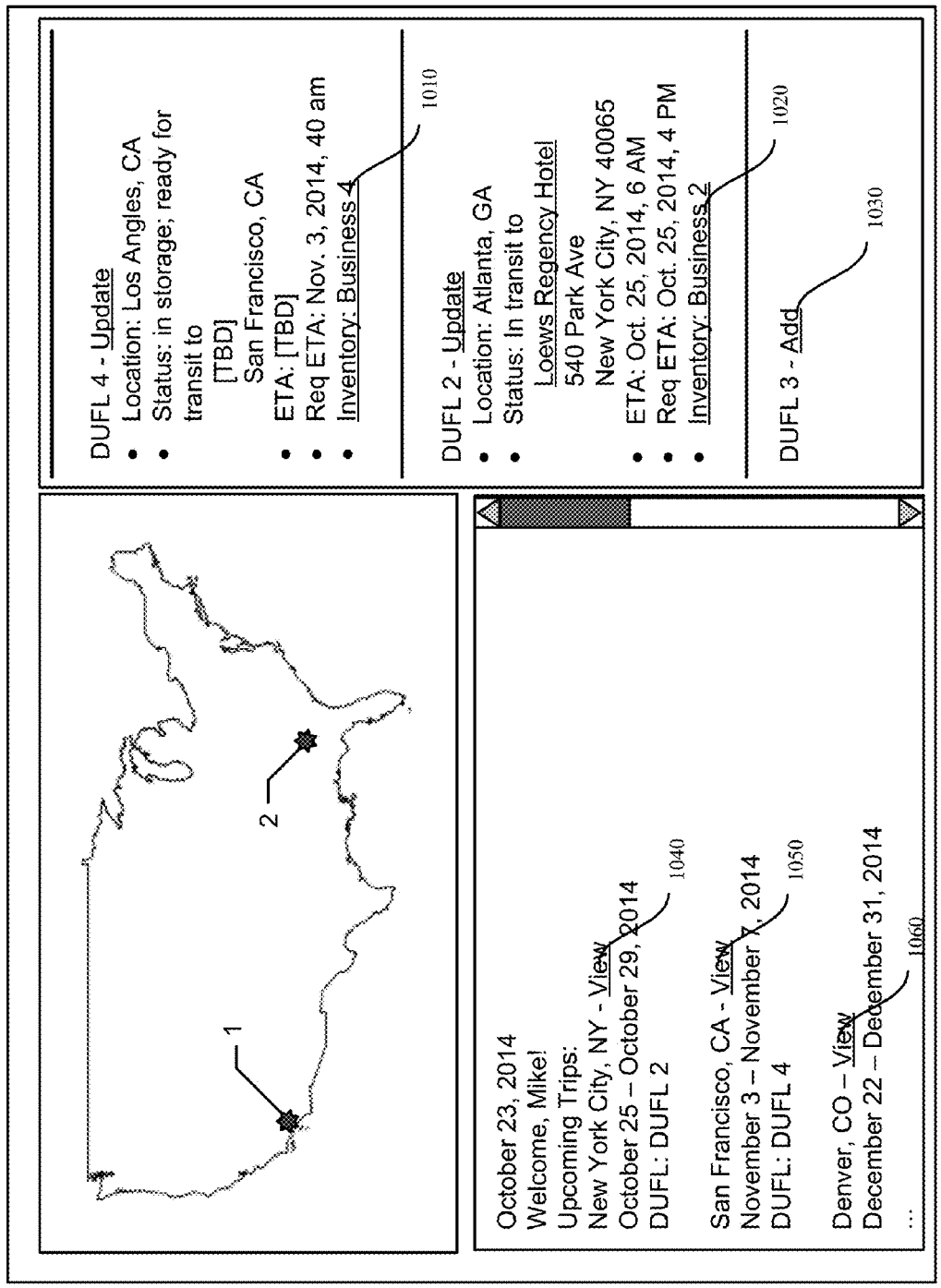
FIG. 10 depicts a simplified diagram of a user interface for managing shipping of one or more transitory storage.

In FIG. 10, a simplified diagram of a user interface for managing shipping of one or more transitory storage 132 is shown. In some embodiments, a user has more than one transitory storage 132. The user interface 324 enables the user to track and manage transitory storage 132. In some embodiments, a user has more than one transitory storage 132 and stores transitory storage 132 based on travel history and/or preferences of the user. For example, the user could have a first transitory storage 132-1 staged (e.g., stored) on the west coast of the United States and a second transitory storage 132-2 staged on the east coast of the United States. Clicking at 1010 will allow the user to view the contents of the "Business 4" transitory storage 132. Clicking on 1020 will allow the user to view the contents of "Business 2" transitory storage 132. Clicking on "Add" at 1030 will allow the user to add objects to "DUFL 3" as shown in FIG. 8. Clicking on any of 1040, 1050, and 1060 will allow the user to view more detail about the respective trips to New York, San Francisco, and Denver.

In this example, a user lives in Tucson, Ariz. and plans a first trip from Tucson to New York City, N.Y., arriving in New York on October 25. The start location for the trip is Tucson, and the destination for the first trip is New York City. The storage enclosure 128 is a storage enclosure near Los Angeles, Calif. Before the trip (e.g., in January), the user sends personal objects (e.g., clothing and toiletries) to the storage enclosure 128 that are stored in the fixed storage 102 associated with the user's Unique Address. In March, the user decides to go on the first trip from Tucson to New York City. The user uses an app on a smart phone (an example of the user device 120) to make a request for delivery of certain objects in the fixed storage 102 in the transitory storage 132 to New York City by October 25. The user provides a hotel and/or a hotel address in New York City. The user interface 324 receives the request to deliver the transitory storage 132 to New York City. The user interface 324 transfers the request to deliver the transitory storage 132 to New York City to the logistics engine 320. The logistics engine 320 schedules with FedEx (an example of a shipper 166) to pick up the transitory storage 132 from the storage enclosure 128 on October 20 for delivery to the hotel by the morning of October 25. The logistics engine 320 provides instruction to the storage enclosure 128 to prepare the transitory storage 132 for pickup by FedEx on October 20, and, at that time, or optionally at a later time prior to pick up, communicates label information, such as a label format and parcel number, to the transitory storage 132, which displays properly formatted label information on the dynamic display 412. The logistics engine stores information about FedEx picking up the transitory storage 132, the hotel information, and instructions to the storage enclosure 128 in the logistics repository 328.

On October 20, FedEx picks up the transitory storage 132 at the storage enclosure and delivers the transitory storage 132 to the hotel the morning of October 25. Because the dynamic display 412 displays the assigned FedEx parcel number in an appropriate FedEx-compatible format, FedEx personnel and systems can handle the transitory storage 132 as a standard FedEx package, including scanning the dynamic display 412 in the same manner and with the same equipment that a FedEx label is scanned, updating FedEx's systems with information about a location and/or progress of the transitory storage 132 as the transitory storage 132 is shipped. A provider interface communicates with FedEx systems application programming interfaces, receives updated information about the location and/or progress of the transitory storage 132 as updates are available, and in turn updates the logistics server 104, the logistics engine 320, the user interface 324, and/or the logistics repository 328.

On October 20, the logistics engine 320 notifies the user interface 324 of FedEx picking up the transitory storage 132 and stores the notification in the logistics repository 328. The user can access information about FedEx picking up the transitory storage 132 through the user interface 324. In some embodiments, the user interface 324 pushes an alert to the user device 120 (e.g., as a text message or to show up in a notification center of the smart phone) that the transitory storage 132 was picked up by FedEx on October 20. Similarly, the user can receive a text that the transitory storage 132 arrived at the hotel on October 25. On the morning of October 25, the user boards an airplane at Tucson and flies to New York City. When the user arrives at the hotel in New York City, a staff member at the hotel gives the user the transitory storage 132 when the user checks-in at the hotel. In some embodiments, the hotel staff sends the transitory storage 132 to the user's room before the user checks in (and the user receives a text that the transitory storage 132 is waiting in the user's room).

On October 15, the user plans a second trip. The second trip is to San Francisco on November 3. The user, using the user device 120, provides information about the second trip to the user interface 324. When the user is finished with the first trip to New York City, the storage concierge 108 sends the transitory storage 132 back to the storage enclosure 128 (or in some embodiments, the user leaves the transitory storage in the user's room or at the front desk of the hotel in New York and the logistics engine 320 instructs the hotel staff to set the transitory storage 132 for pick up by a shipper 166 for delivery from New York to the storage enclosure). The logistics engine 320 schedules clothes in the transitory storage 132 to be washed and pressed, and for shoes in the transitory storage 132 to be polished (and an alert sent to the user when the objects are ready). The logistics engine 320 also directs these objects to the user's fixed storage 102 associated with the user's Unique Address. The logistics engine 320 processes the user request for objects to be delivered to a hotel in San Francisco, removes the requested objects from the fixed storage 102 and places them in the transitory storage 132. The logistics engine 320 further schedules with UPS to deliver the transitory storage 132 from the storage enclosure 128 to a hotel in San Francisco, so that the transitory storage 132 is waiting for the user when the user arrives in San Francisco on November 3.

Figure 11:
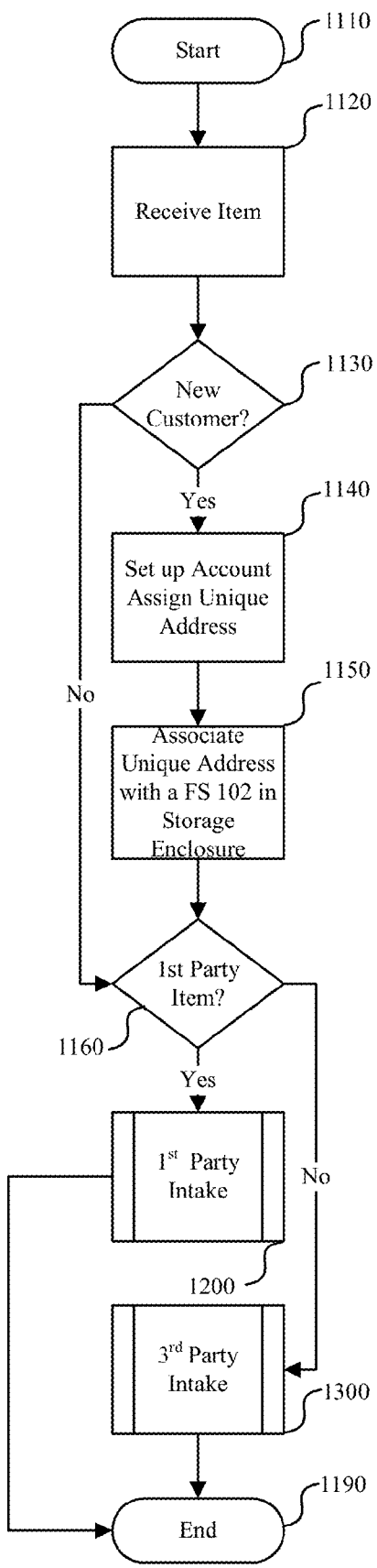
FIG. 11 is a flowchart of the concierge fixed storage receiving a user object.

FIG. 11 is a flowchart of the concierge fixed storage receiving a user object. The storage concierge 108 process starts at 1110. The storage concierge 108 receives an object at block 1120. The object may be coming from an existing or a new user. The storage concierge 108 checks first to determine whether the object is coming from a new user at block 1130. If the object is coming from a new user the storage concierge 108 sets up an account with the user device 120 and assigns the new user a Unique Address at block 1140. During account set-up the storage concierge by send an application to the user's device 120. The user device 120 will also provide preferences to the storage concierge 108 using the downloaded application. The Unique Address associates the user with a storage enclosure 128 and a fixed storage 102 at block 1150 based on initial information the user provides to the storage concierge 108. For instance, if the new user lives in California but travels to New York frequently, the storage concierge 108 will assign the user to a storage enclosure 128 located proximate to New York. The storage concierge will assign the user a fixed storage 102 in the storage enclosure 128 based on the number and volume of objects the user wants to maintain in the fixed storage 102. For instance, if the user wants to keep golf clubs, skis, snow shoes, kayak, business clothes, and sales samples in fixed storage 102, the storage concierge 108 will assign the user a larger fixed storage 102. But if the user is only sending a business suit and associated objects for a business meeting, the storage concierge 108 will assign a smaller fixed storage 102 to the user. The Unique Address the storage concierge 108 assigns to the user associates the user to the storage enclosure 128 and the fixed storage 102 the storage concierge 108 assigned to the user. When a user initially starts using the storage concierge 108 the user initially sends objects to the fixed storage 102 at the storage enclosure 128 associated with the Unique Address the storage concierge 108 assigns to the user. The user may send one or many objects to the fixed storage 102 at a time. The user may decide over time to send more objects to the fixed storage 102. For instance the user may initially only use the storage concierge 108 to store business travel attire and objects. The user may them decide to add personal travel options to the fixed storage 102 to include skis, poles, boots, and ski attire. The user may acquire objects on a trip and send them to fixed storage 102 in a transitory storage 132 returning from a trip. Each object the storage concierge 108 receives that the user wants is processed, added to the fixed storage 102, and added to the fixed storage 102 inventory.

At block 1160 if the user is an existing user, the storage concierge 108 checks to see if the object is coming from the user at block 1160. If so—the object coming from the user is processed by the $1^{st}$ party intake process at 1200. If not—the object coming from a $3^{rd}$ party to the user's fixed storage 102 is processed by the $3^{rd}$ party intake process at 1300. At block 1190 the process of receiving objects from the user and third parties to be stored in the fixed storage 102 ends.

Figure 12:
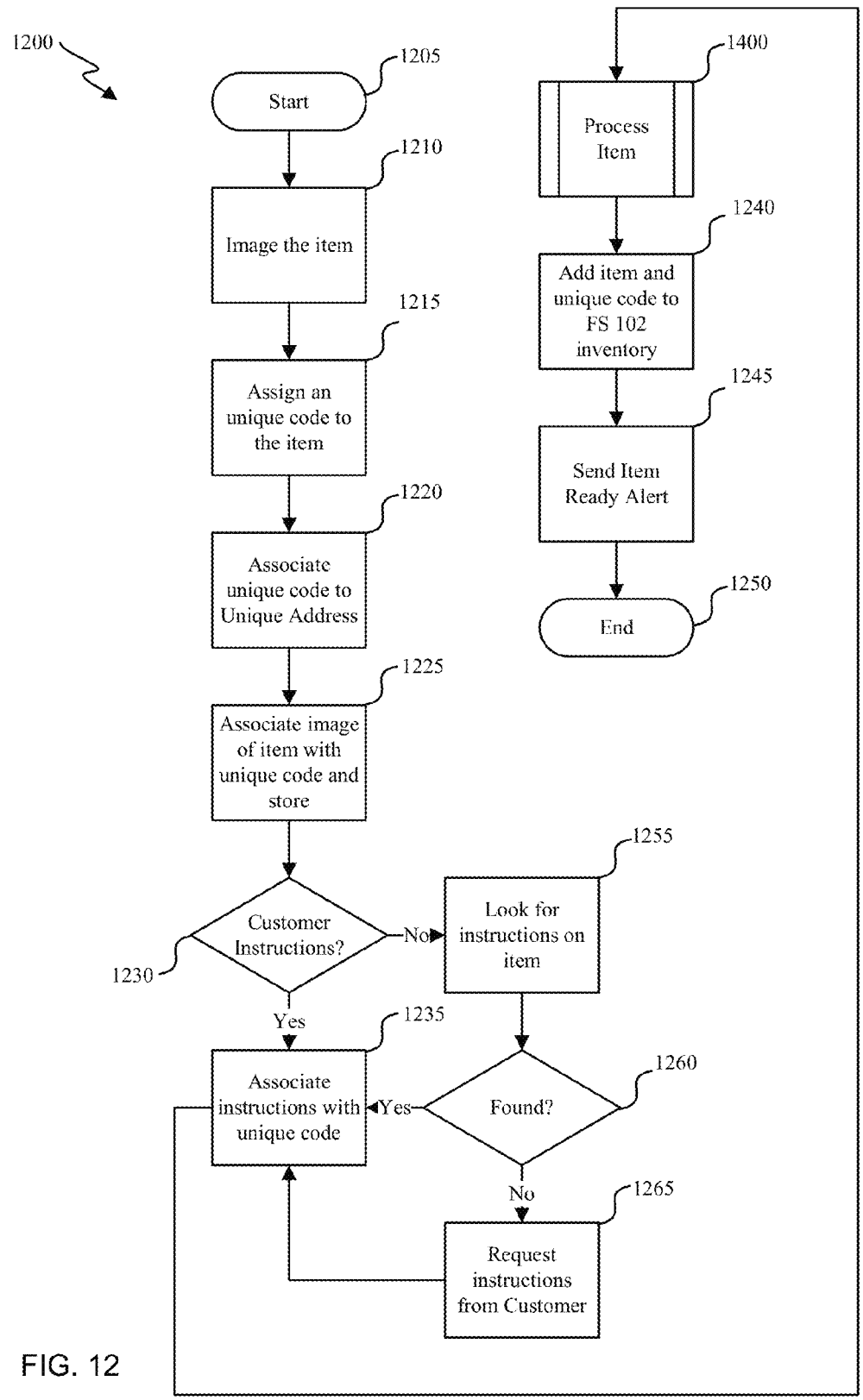
FIG. 12 is a flowchart of the concierge fixed storage workflow for taking in an object received from the user directly.

FIG. 12 is a flowchart of the concierge fixed storage workflow for taking in an object received from the user directly. The $1^{st}$ party intake 1200 starts at block 1205. In the first block in the $1^{st}$ party intake 1200 at 1210 the storage concierge 108 digitally images the received object. This image can be viewed by the storage concierge 108 operators and by the user from a user device 120. The storage concierge 108 then associates an unique code to the object at block 1215. At block 1220 the storage concierge 108 associates the unique code to the user's Unique Address. At block 1225 the storage concierge 108 associates the picture of the object with the unique code. Once the storage concierge 108 has completed blocks 1210 to 1225 the user can view the object on the storage concierge 108 account associated with the user Unique Address using user device 120 through user interface 324. Next, at block 1230, the storage concierge 108 determines if the user included instructions for processing the object. Instructions can comprise cleaning instructions, storing instructions, and repair instructions. If the user did not include instructions the storage concierge 108 determines if the object itself includes instructions at block 1255. At block 1260 if the object did not include instructions, the storage concierge 108 requests the user to send instructions for the object at block 1265 through the user interface 324. The storage concierge 108 associates the instructions with the unique code for the object at block 1235. Once the storage concierge 108 has associated the instructions for the object with the unique code for the object—it uses the instructions to process the object at process 1400. Once the storage concierge is finished processing the object, it adds the object and the assigned unique code to the fixed storage 102 inventory at block 1240. Then the storage concierge 108 alerts the user on the user device 120 using the user interface 324 that the object is processed and in the fixed storage 102 at block 1245. The user can view the fixed storage inventory on the storage concierge 108 account associated with the user's Unique Address at any time using the user device 120 through the user interface 324. At this point the process for $1^{st}$ party intake 1200 is finished at block 1250.

Figure 13:
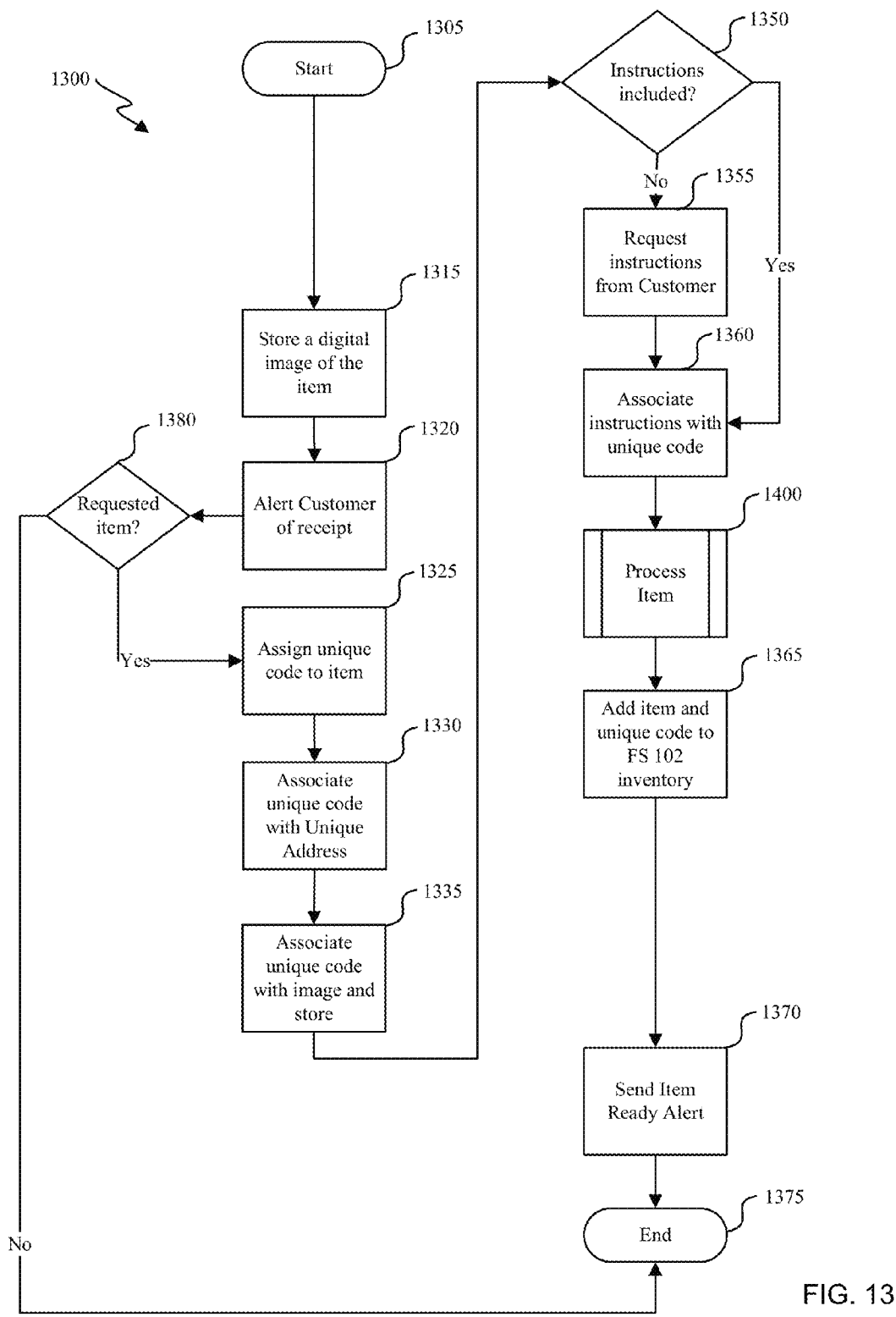
FIG. 13 is a flowchart of the concierge fixed storage workflow for taking in an object received from a third party.

FIG. 13 is a flowchart of the concierge fixed storage workflow for taking in an object received from a third party. The $3^{rd}$ party intake 1300 is very similar to $1^{st}$ party intake 1200. The $3^{rd}$ party intake 1300 intakes objects that come from 3rd party providers 126 and objects in transitory storage 132 that were not in the transitory storage 132 initial manifest. The $3^{rd}$ party intake 1300 checks to make sure the user wants the objects received in these cases in case the merchandise provider 126 sent the wrong object or otherwise sent the object to the Unique Address by accident or if an object, in transitory storage 132 received back to storage enclosure 128, that wasn't on the original manifest is not one that should have been in the transitory storage 132—and therefor is an object the user does not want. The $3^{rd}$ party intake 1300 starts at block 1305. The first block in the $3^{rd}$ party intake 1300 at 1315 is to take a picture of the received object. Next the storage concierge 108 sends the picture of the object to the user and determines if the user wants the object at block 1380. If the user does not want the object, $3^{rd}$ party intake is over at block 1375. If the user wants the object, the storage concierge 108 then associates an unique code to the object at block 1325. At block 1330 the storage concierge 108 associates the unique code to the user's Unique Address. At block 1335 the storage concierge 108 associates the picture of the object with the unique code. Once the storage concierge 108 has completed blocks 1315 to 1335 the user can view the object on the storage concierge 108 account associated with the user Unique Address. Next, the storage concierge 108 determines if the object itself includes instructions at block 1350. At block 1355 if the object did not include instructions, the storage concierge 108 requests the user to send processing instructions for the object. The storage concierge 108 associates the instructions with the unique code for the object at block 1360. Once the storage concierge 108 has associated the instructions for the object with the unique code for the object—it uses the instructions to process the object at process 1400. Once the storage concierge is finished processing the object, it adds the object and the assigned unique code to the fixed storage 102 inventory at block 1365. Then the storage concierge 108 alerts the user that the object is processed and in the fixed storage 102 at block 1370. The user can view the fixed storage inventory on the storage concierge 108 account associated with the user's Unique Address at any time. At this point the process for $1^{st}$ party intake 1300 is finished at block 1375.

Figure 14:
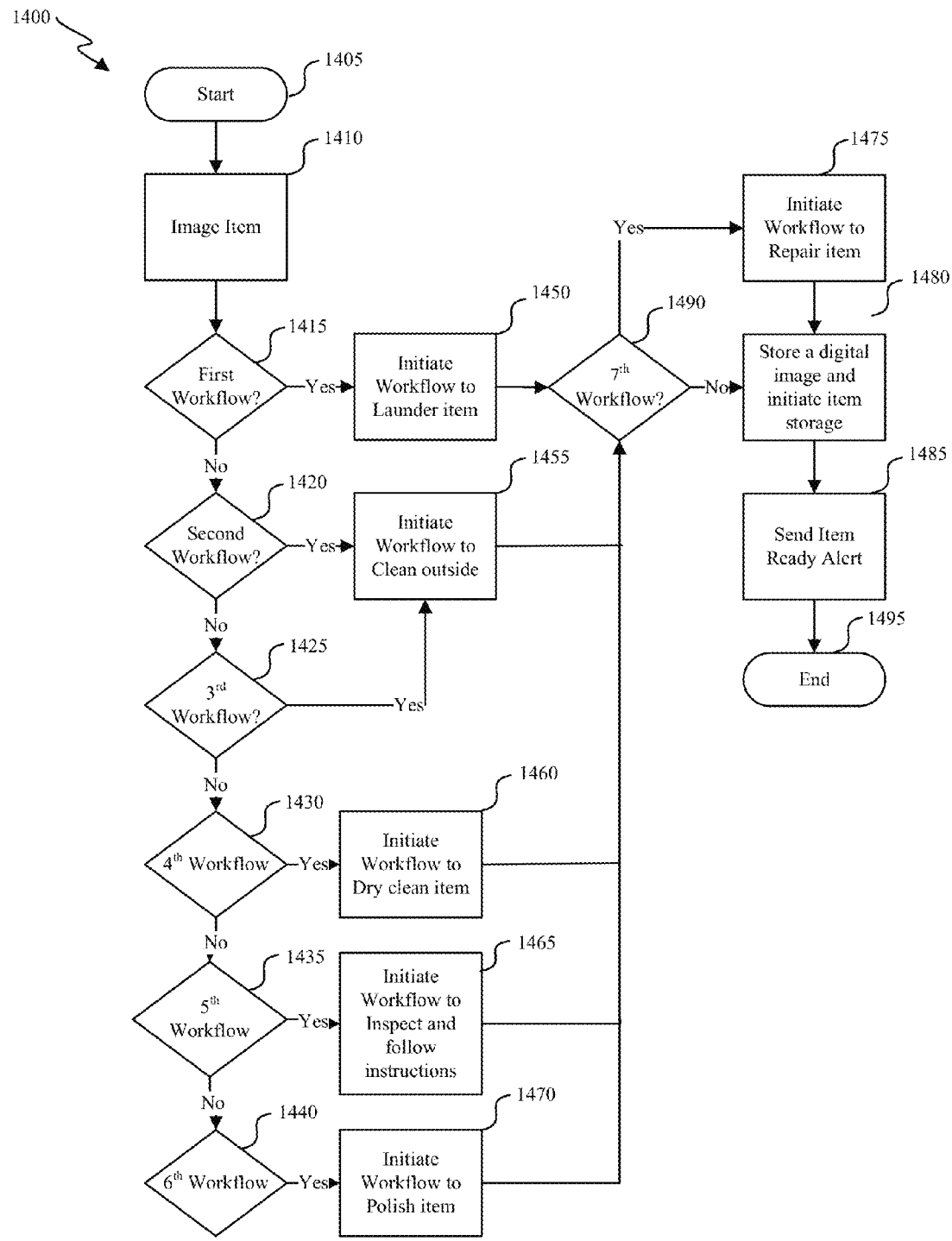
FIG. 14 is a flowchart of the concierge fixed storage workflow for processing a received object.

FIG. 14 is a flowchart of the concierge fixed storage workflow for processing a received object. Users can send many types of objects to the storage concierge 108 to store in the fixed storage 102. These objects comprise business clothes, casual clothes, formal clothes, shoes, outerwear, boots, extreme weather gear, athletic gear, marketing materials, sales materials, sporting goods of all kinds such skis, golf club sets, hockey sticks, tennis rackets, and kayaks, construction goods, personal goods, electronic goods, wine, and tools. Because of the diversity of the objects the user can send to the fixed storage 102, the storage concierge 108 must be able to process objects in a number of different ways. Process object 1400 starts at block 1405. At block 1410 the storage concierge 108 inspects the object and store a digital image of the object as received. At block 1415 the logistics engine 320 determines if it needs to initiate aa first workflow to launder an item. If so—at block 1450 it initiates the first workflow to launder the item. At block 1420 the logistics engine 320 determines if it needs to initiate a second workflow to clean an item and if so, at block 1455 it initiates the second workflow. At block 1425 the logistics engine determines if a third workflow needs to initiated and initiates the workflow at block 1455. At block 1430 the logistics engine determines if it needs to initiate a $4^{th}$ workflow to dry clean the object and, if so, initiates the forth workflow at block 1460. At block 1435 the logistics engine determines if a fifth workflow should be initiated, and if so it initiates the fifth workflow at block 1465. At block 1440 the logistics engine determines if a sixth workflow should be initiates and at block 1470 it initiates it if so. At block 1490 the logistics engine determines if it needs to initiate a $7^{th}$ workflow to repair an object and initiates the workflow at block 1475 if it does. The concierge fixed storage 108 then stores the object in the fixed storage 102 according to the instructions associated with the object at block 1480 after storing a digital image of the object in the user's account. At block 1485 it alerts the user that the object has been processed and stored in the fixed storage 102. The process is over when reaching block 1495. The user can view the image of the object on the user account.

Figure 15:
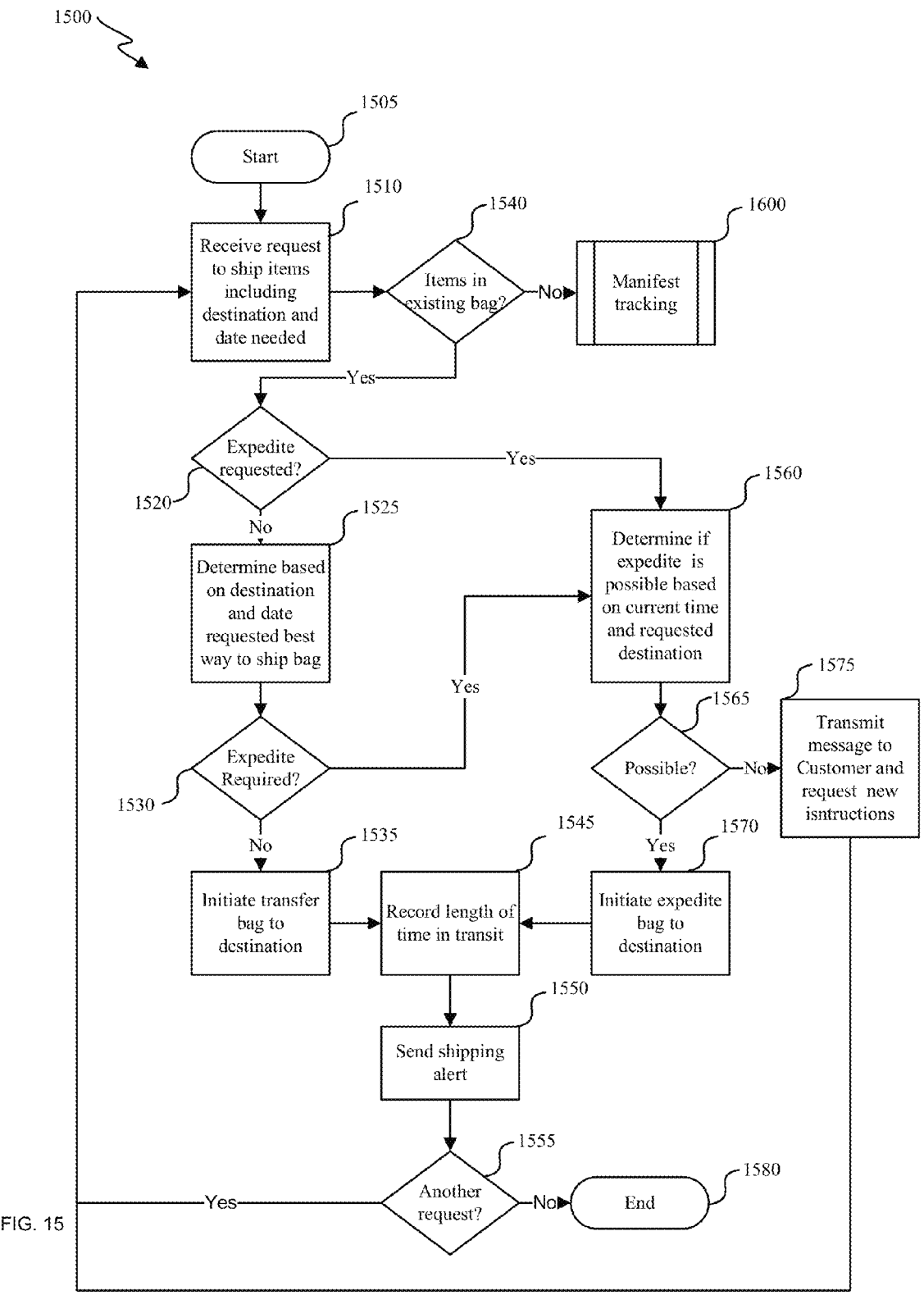
FIG. 15 is a flowchart of the concierge fixed storage workflow for shipping a bag.

FIG. 15 is a flowchart of the concierge fixed storage workflow for shipping a transitory storage 132. A user can request that objects from their fixed storage 102 be shipped to a destination at a specific date and time. Alternatively, a user can request that objects already in a transitory storage 132 be shipped to a specific destination and a specific time and date. Ship transitory storage 1500 begins at start 1505. At block 1510 the concierge fixed storage 108 receives a request to ship objects that includes at least the objects to be shipped, the destination, and the date and time the objects are needed. At block 1540 the concierge fixed storage 108 determines if this is a request to ship objects already in the transitory storage 132. If not, the next block is Manifest tracking 1600. If the objects are already in the transitory storage 132, the storage concierge 108 then determines if the user has requested if the transitory storage should be expedited at block 1520. If so, at the next block, 1560, the storage concierge 108 determines if expediting the transitory storage is possible based on the current time, requested destination, and date and time the objects are needed. At block 1565 if it is possible to expedite the transitory storage 132, the storage concierge 108 determines the best option to expedite the transitory storage 132 and expedites the transitory storage 132. At block 1545 the concierge fixed storage 108 records the time in transit and alerts the user the transitory storage 132 has arrived in block 1550. At block 1565 if it is not possible for the transitory storage 132 to be expedited, the concierge fixed storage 108 notifies the user that it is not possible and requests new instructions at block 1575. The storage concierge 108 then waits for new instructions at block 1510. At block 1520 if the user did not request to expedite the objects, the storage concierge 108 determines the best way to ship the transitory storage 132 based on cost, delivery options, destination, and the date and time the user needs the transitory storage 132 at block 1525. At this point the storage concierge determines if it needs to expedite the transitory storage 132 at block 1530. If so, at the next block, 1560, the storage concierge 108 determines if expediting the transitory storage is possible based on the current time, requested destination, and date and time the objects are needed. At block 1565 if it is possible to expedite the transitory storage 132, the storage concierge 108 determines the best option to expedite the transitory storage 132 and expedites the transitory storage 132. At block 1545 the concierge fixed storage 108 records the time in transit and alerts the user the transitory storage 132 has arrived in block 1550. At block 1565 if it is not possible for the transitory storage 132 to be expedited, the concierge fixed storage 108 notifies the user that it is not possible and requests new instructions at block 1575. If at expedition is not required at block 1530, then the concierge fixed storage 108 transfers the transitory storage 132 to the destination using one or more service providers 124 at block 1535. At block 1545 the storage concierge 108 records how long the transitory storage 132 was in transit and then alerts the user the transitory storage 132 has arrived at block 1550. The duration of time the transitory storage 132 is in transit can be correlated with the service provider 124 and tracked over time to determine the performance of the service providers 124. This performance can be used at block 1525 for determining the best option to ship a transitory storage 132 in the future. At block 1555 the storage concierge 108 determines if there is another request pending. If there is another request pending, it receives the request at block 1510. If there is not another request pending, ship transitory storage 1500 is over at block 1580.

Figure 16:
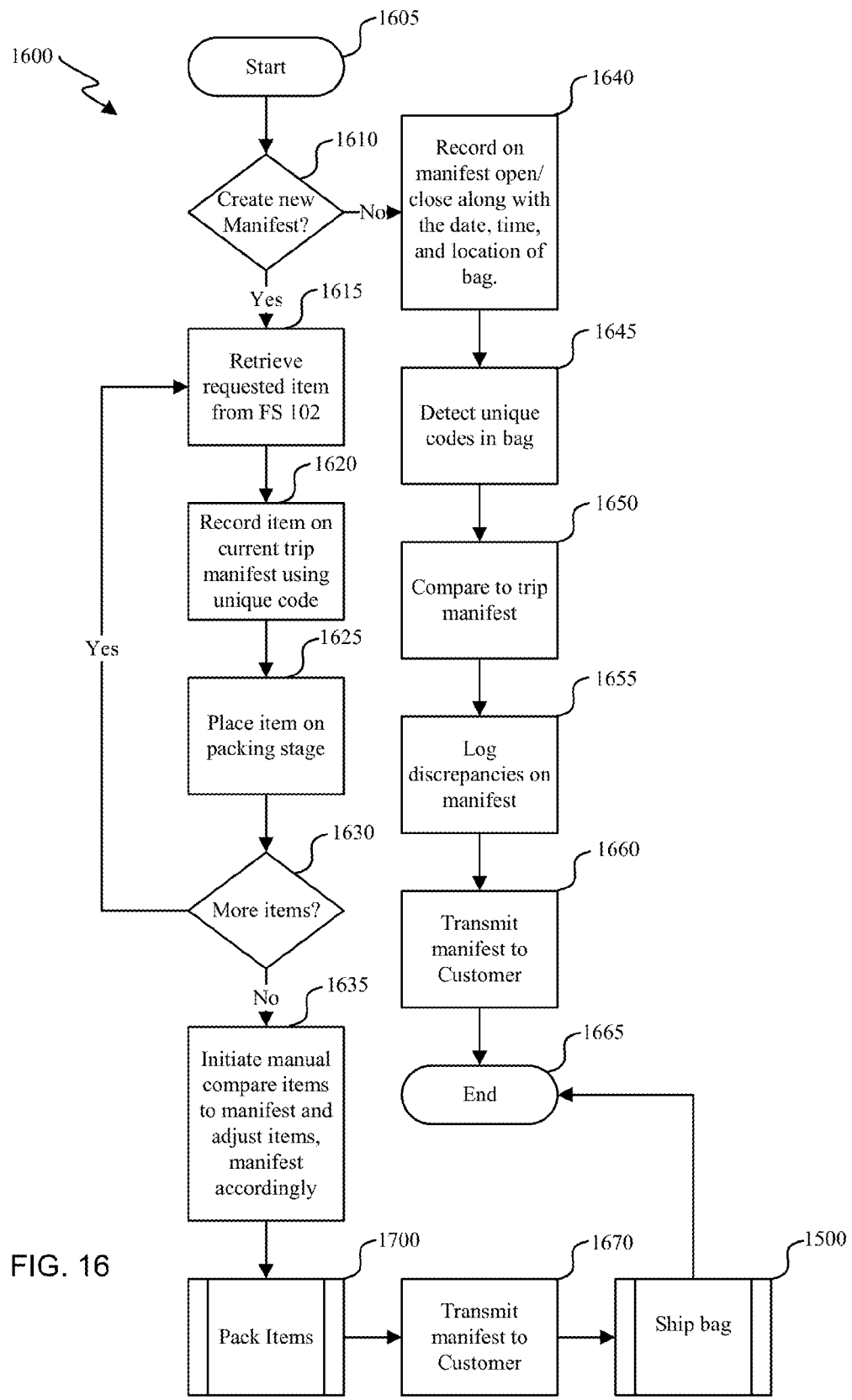
FIG. 16 is a flowchart of the concierge fixed storage workflow for creating a manifest for shipping objects in the closet.

FIG. 16 is a flowchart of the concierge fixed storage workflow for creating and updating a manifest for shipping objects in the fixed storage 102. When the user requests that objects from fixed storage 102 be shipped, the storage concierge 102 creates a manifest of the objects taken from the fixed storage 102 and shipped in transitory storage 132. Once created, the manifest of the object is updated every time the transitory storage 132 is opened so that every object in the transitory storage 132 is accounted for. If an object is missing from the transitory storage 132, the storage concierge 108 can use the manifest tracking log to determine at what point the object was missing from the transitory storage 132. Manifest tracking 1600 starts at block 1605. At the next block 1610, the storage concierge 108 determines if the request to ship objects is a request for objects already in the transitory storage 132 (meaning a manifest has been created already) that is in transit, or if the request is a new request requiring the storage concierge 108 to create a new manifest. If the request is new, the storage concierge 108 retrieves the object from the fixed storage 102 associated with the user's Unique Address at block 1615. The storage concierge 108 then records the object on the trip manifest using the unique code assigned to the object at block 1620. RFID scanner 216, barcode scanner 220, QR code scanner 218, and/or any other scanner is used to scan the unique code assigned to the object and record it on the manifest. At the next block, 1625, the object is placed in a staging area in preparation for placing all objects into the transitory storage 132. At block 1630 the concierge fixed storage 108 determines if there are more objects to ship, if so it repeats blocks 1615 to 1630. Next, at optional block 1635, if all objects that the user requested are in the staging area, the storage concierge 108 manually compares the objects in the staging area to the created manifest and cross references the manifest to the objects the user has requested. The manual inspection also compares the picture associated with each object code to the object to make sure each object is correctly coded and included in the objects to be shipped. The storage concierge 108 manually adjusts the manifest to correct any errors. The next block is pack objects 1700. Once the objects have been packed the manifest is transmitted to the user at block 1670. The next block is to ship transitory storage 1500 and end at 1665. If, back at block 1610, the manifest was already created for an existing transitory storage 132, then at block 1640 the concierge fixed storage 108 will record in the manifest that the transitory storage 132 was opened and the date, time, and location where the transitory storage 132 was opened. The storage concierge 108 will also detect the objects in the transitory storage 132 by detecting the unique codes of the objects in the transitory storage 132 at block 1645. The storage concierge 108 will also compare the detected list of objects to the manifest at block 1650, log discrepancies in the manifest at block 1655, and transmit the manifest to the user at block 1660. Accordingly, every time the transitory storage 132 is opened, the user will know what objects are in the transitory storage 132, and if there are discrepancies in the manifest. At block 1665 manifest tracking 1600 is over.

Figure 17:
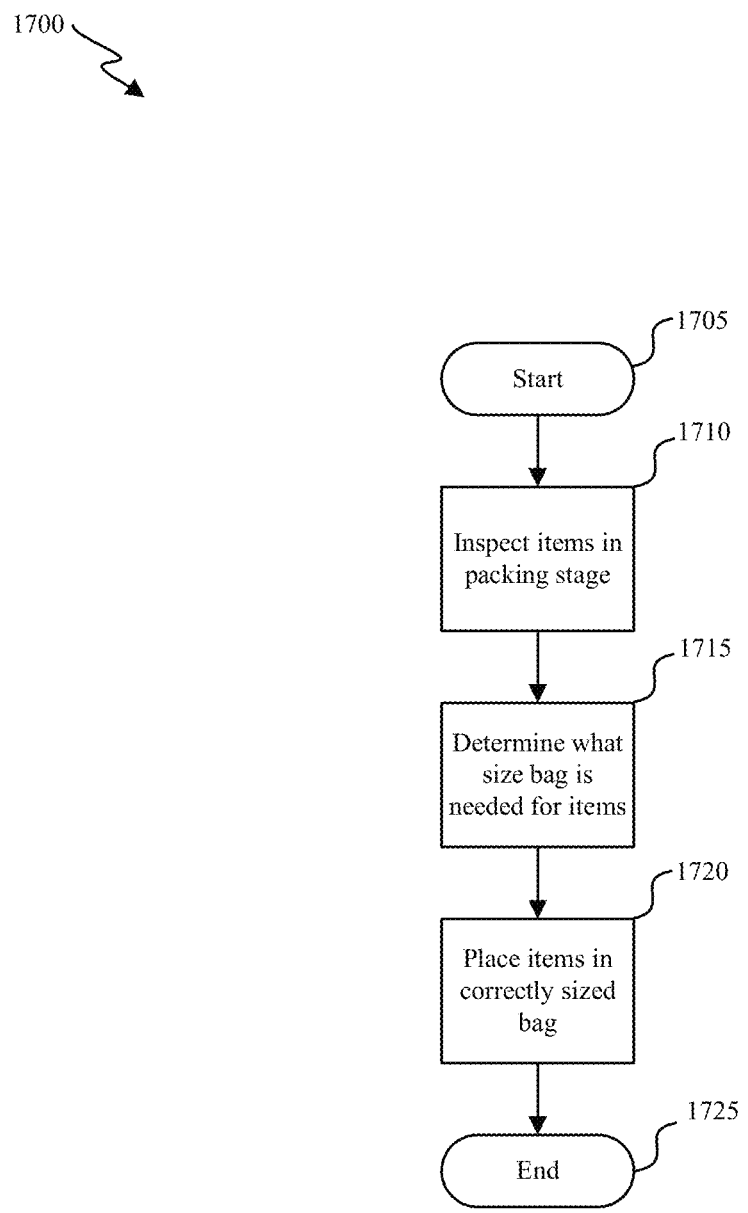
FIG. 17 is a flowchart of the concierge fixed storage workflow for placing objects in the correct transitory storage size.

FIG. 17 is a flowchart of the concierge fixed storage workflow for placing objects in the correct transitory storage size. The storage concierge 108 uses multiple sized transitory storage 132 to ship objects in the fixed storage 102 to at least: ship the transitory storage 132 as efficiently as possible; for the convenience of the user; and to preserve the integrity of objects in the transitory storage 132. For instance, if too few objects are placed in too large of the transitory storage 132—such things as folded clothing objects—the objects will become unfolded and jumbled and arrive in a condition not ready to wear. On the other hand if too many clothing objects are crammed into the transitory storage 132, they too will arrive in a wrinkled condition not ready to wear. Furthermore, it is more cost efficient to ship a smaller package than a larger one—so the smallest transitory storage that comfortably fits the requested object is more cost efficient that an a larger bag. And, for example, a smaller transitory storage 132 might be more desirable to a user because it takes up less space and is easier to move. There are several methods of determining the correct sized bag. The logistics engine 320 can, for example, determine the dimensions of all objects selected by the user, and with the given dimensions of the three or more sizes of transitory storage 132, compute the size of transitory storage 132 needed to fit all of the objects. The logistics engine 320 might also take weight into account when calculating the best sized transitory storage 132. The logistics engine 320 can use a "largest object first" algorithm—by sizing the transitory storage 132 to have at least as large of dimensions as the largest object selected. The logistics engine 320 can then determine the volume remaining in the transitory storage 132 to determine if the dimensional volume of the remaining items will fit. The logistics engine 320 must also compute, even if there is enough volume, if the size and shapes of the remaining objects fit in the transitory storage 132 selected based on the largest object. FIG. 9 discusses this in more depth. The first block of pack objects 1700 is to start at block 1705. At block 1710 the concierge fixed storage 108 inspects the objects in the staging area. At block 1715 the concierge fixed storage determines what size of the transitory storage 132 is required for the objects. There are many ways that this can be done, including, but not limited to, manually, by weight of the objects, by volume, by number of objects, by size of objects, by type of objects, and/or any combination of the above. Once the correct sized transitory storage 132 is determined for a set of objects in the fixed storage 102 associated with the Unique Address, the same sized transitory storage 132 can be used for each time the user wants to ship the same objects. At the next block 1720, the objects are placed in the transitory storage 132 selected, and pack objects 1700 ends at block 1725.

Figure 18:
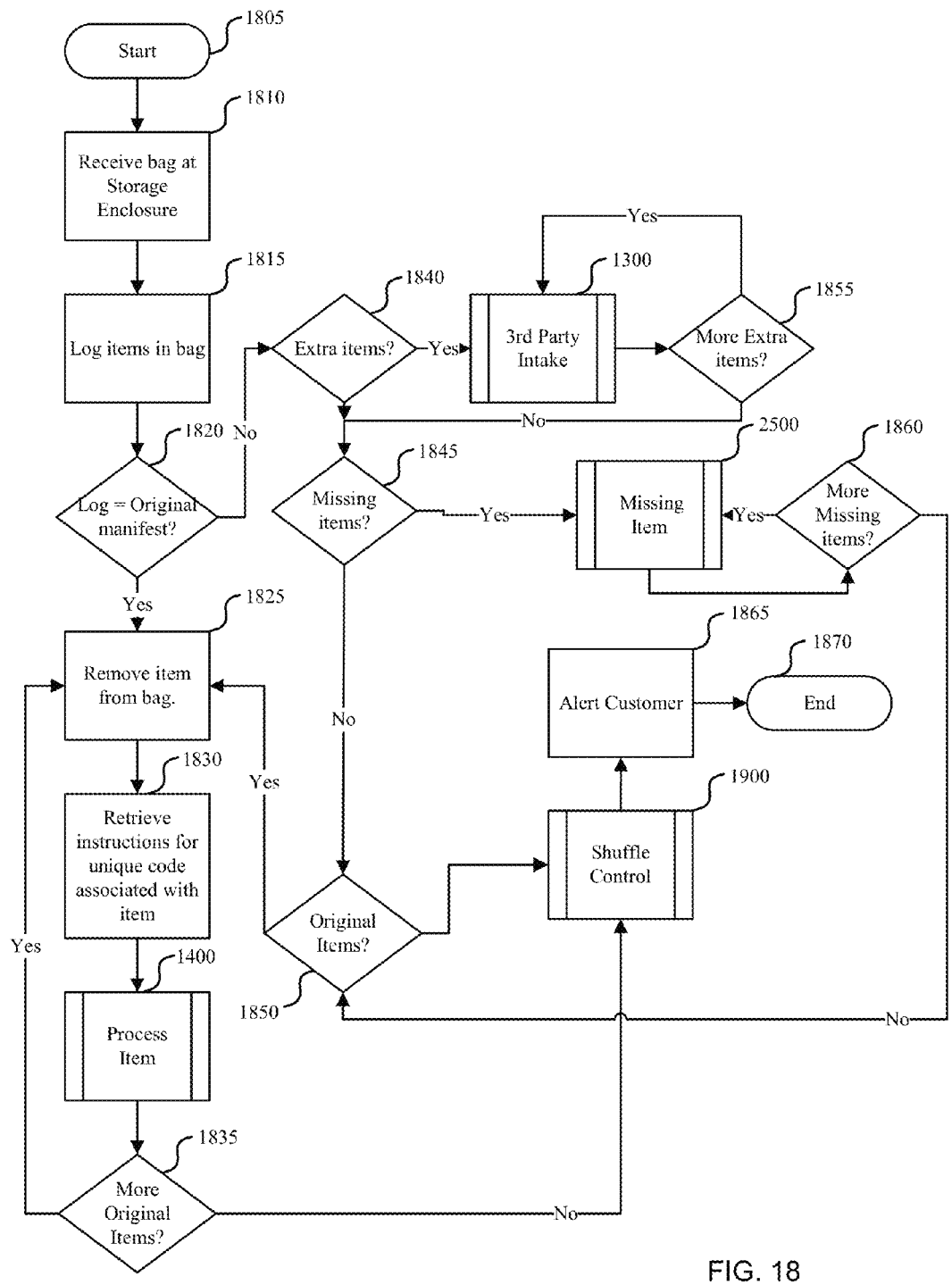
FIG. 18 is a flowchart of the concierge fixed storage workflow for receiving a returned bag.

FIG. 18 is a flowchart of the concierge fixed storage workflow for receiving the returned transitory storage 132. When a user is finished with the objects in the transitory storage 132, the user alerts the storage concierge 108. The storage concierge 108 causes the transitory storage 132 to be shipped to the storage enclosure 128 associated with the user's Unique Address. The receiving process starts at block 1805. At the next block 1810, the concierge fixed storage 108 receives the transitory storage at the storage enclosure 128. At block 1815 the concierge fixed storage 102 opens the transitory storage 132 and logs the objects in the transitory storage 132. At block 1820 the concierge fixed storage 108 compares the objects in the transitory storage 132 to the manifest created when the objects were placed in the transitory storage 132 at block 1720. If the log of the objects in the transitory storage 132 is the same as the manifest, the concierge fixed storage 108 remove the objects from the transitory storage 132 at block 1825. Then at block 1830 the storage concierge 108 retrieves the instructions associated with the object's unique code and sends the object to process object 1400 to be processed. At this point the storage concierge 108 determines if there are more objects in the transitory storage 132 at block 1835. If there are, it repeats blocks 1825-1835. If there are not more objects, concierge fixed storage 108 performs shuffle control 1900, and then alerts the user that the objects are back in the fixed storage 102 at block 1865. At that point the receiving a transitory storage process ends at block 1870. If back at block 1820 the storage concierge 108 determines that the log does not match the manifest, it proceeds to determine if there are objects on the log that were not on the manifest at block 1840. If there are, it proceeds to perform 3$^{rd}$ party intake 1300. And then it checks to see if there are more extra objects at block 1855. If there are, it repeats 1300 and block 1855. If there are not it proceeds to block 1845 to determine if there are objects on the manifest that are not on the log. If there are missing objects it proceeds to process missing objects 2500 and then determines if there are more missing objects at block 1860. If there are it repeats 2500 and block 1860. If not the storage concierge 108 proceeds to block 1850 to determine if there are still objects on the original manifest on the log and, therefore, in the transitory storage 132. If there are, blocks 1825-1835 are repeated. If there are not, the storage concierge 108 proceeds to blocks 1900-1870 as previously discussed.

Figure 19:
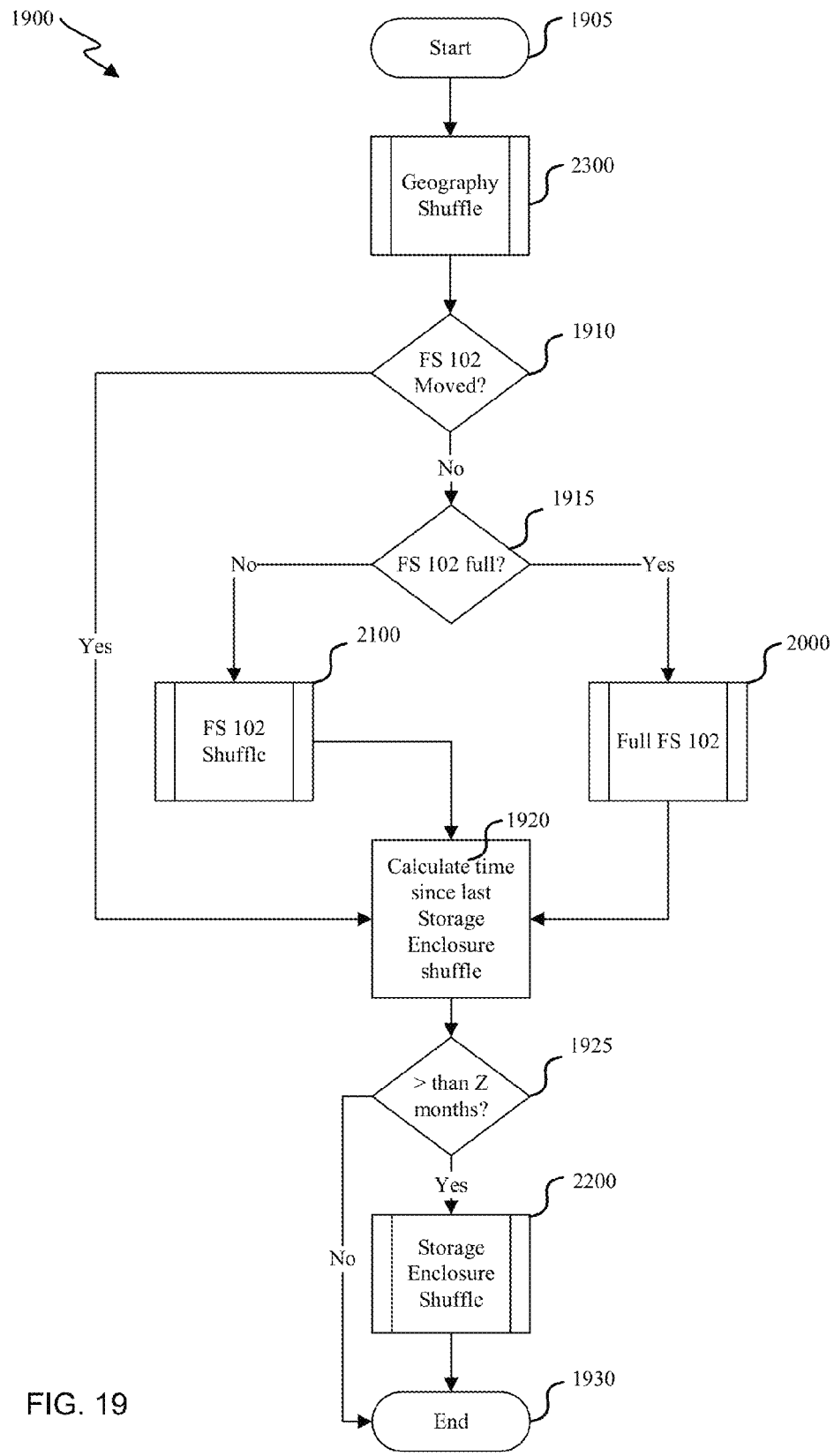
FIG. 19 is a flowchart of the concierge fixed storage workflow for controlling storage enclosure and fixed storage shuffling.

FIG. 19 is a flowchart of the concierge fixed storage workflow for controlling storage enclosure and fixed storage shuffling. The storage concierge 108 has to periodically shuffle fixed storage 102 and storage enclosures 128 because users need a different sized fixed storage 102 in the same storage enclosure 128, a same or different sized fixed storage 102 in a different storage enclosure 128, or fixed storage 102 need to be shuffled within a storage enclosure 128 for all users for efficiency purposes. Shuffle control 1900 starts at block 1905. Next it proceeds to geography shuffle 2300. If the fixed storage 102 was moved at 2300, the storage concierge 108 proceeds to block 1920. If the fixed storage 102 was not moved during geography shuffle 2300, the storage concierge 108 next determines if the fixed storage 102 is full at block 1915. If the fixed storage 102 is full the storage concierge 108 proceeds to full fixed storage 2000 and then to block 1920. If at block 1915 the fixed storage 102 is not full then the storage concierge 108 proceeds to fixed storage shuffle 2100. It then goes to block 1920 to calculate the time since the last time the storage concierge 108 performed a storage enclosure shuffle 2200. If the storage enclosure shuffle 2200 has not been performed in the predetermined time, Z at block 1925, then it performs storage enclosure shuffle 2200 and then goes to block 1930. If not, then the storage concierge 108 proceeds to the end block at 1930.

Figure 20:
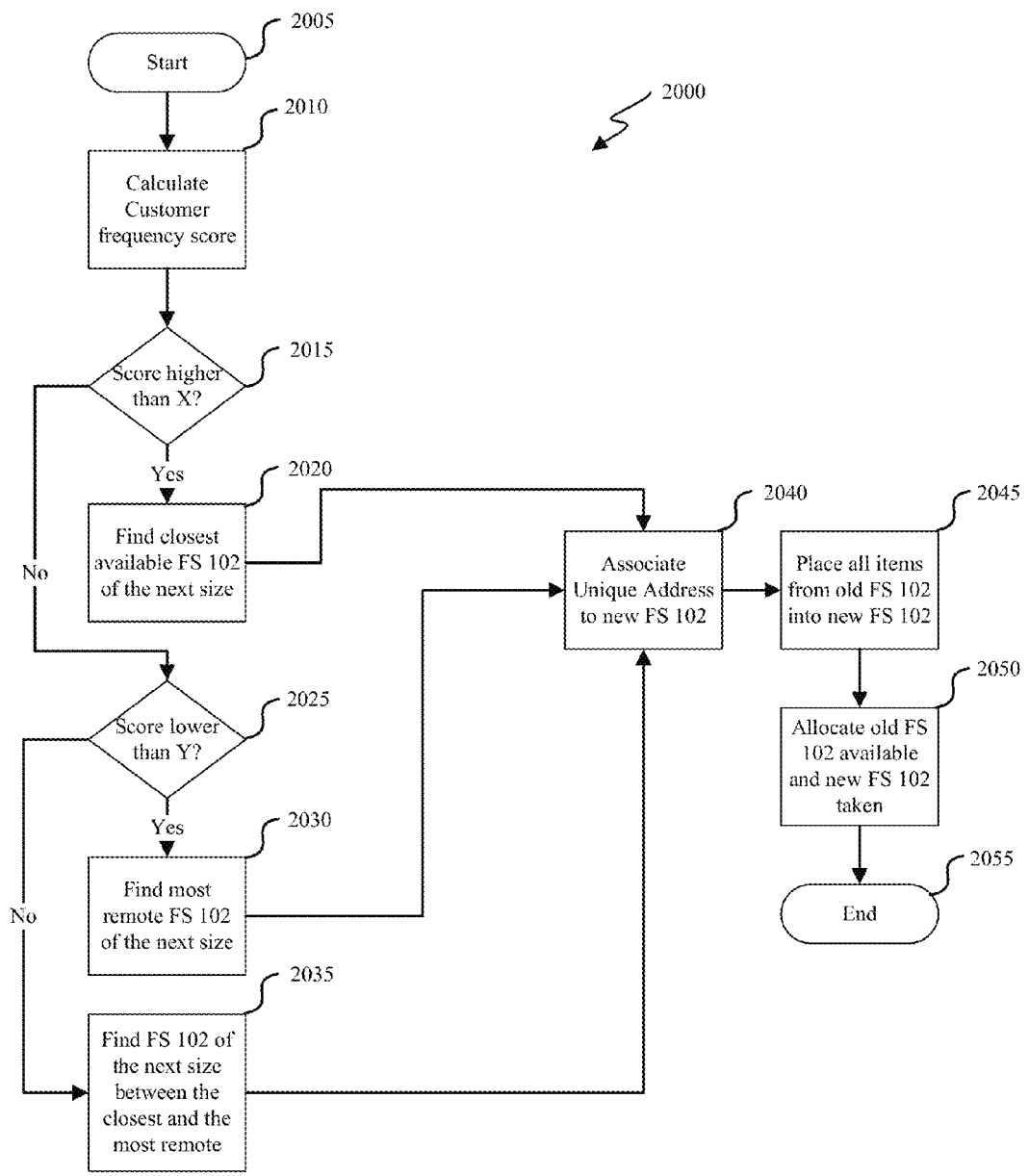
FIG. 20 is a flowchart of the concierge fixed storage workflow for full fixed storage management.

FIG. 20 is a flowchart of the concierge fixed storage workflow for full fixed storage management. When the user ship more objects or has merchandise provider 126 ship more objects to the fixed storage 102, the fixed storage 102 can become inadequate to accommodate the objects. The objects from the user's fixed storage 102 must be moved to another fixed storage 102. Block 2005 starts full fixed storage 2000. At block 2010 the storage concierge 108 calculates the user's frequency score. The frequency score is calculated by any number of methods including, but not limited to, average number of shipment requests per month for the user, the highest number of cumulative shipment requests for the user in a storage enclosure 128, and/or any other method of computing a frequency score. Predetermined thresholds are computed for the storage enclosure by any number of methods including the average shipping rate for the storage enclosure 128 per month; which is computed by taking the number of shipping requests in a month for the entire storage enclosure 128 and dividing that number by the number of user fixed storage 102 in the storage enclosure 128. Then, for example, a high threshold "X" can be any % over 50%, and a low threshold "Y" can be any percent under 50%. The high and low threshold can change over time based on various criteria. Once a user's frequency score exceeds the predetermined threshold "X," as determined at block 2015, the storage concierge 108 finds the closest available fixed storage 102 in the storage enclosure 128 of the next size and then proceeds to block 2040. If the frequency score at block 2015 is not higher than "X," then the storage concierge determines if the frequency score is lower than a predetermined threshold, "Y" at block 2025. If the score is lower than "Y," the concierge fixed storage 102 finds the most remote available fixed storage 102 in storage enclosure 128 of the next size and then proceeds to block 2040. If the frequency score is not lower than "Y" at block 2025 then the storage concierge 108 finds the available fixed storage 102 of the next size between the closest and most remote fixed storage 102 of the next size and proceeds to block 2040. At that block the storage concierge 108 associates the user's Unique Address with new fixed storage 102 and then places all of the objects from the old fixed storage 102 to the new fixed storage 102 at block 2045. At block 2050 it allocates the old fixed storage 102 as available in storage enclosure 128. Full fixed storage 2000 ends at block 2055.

Figure 21:
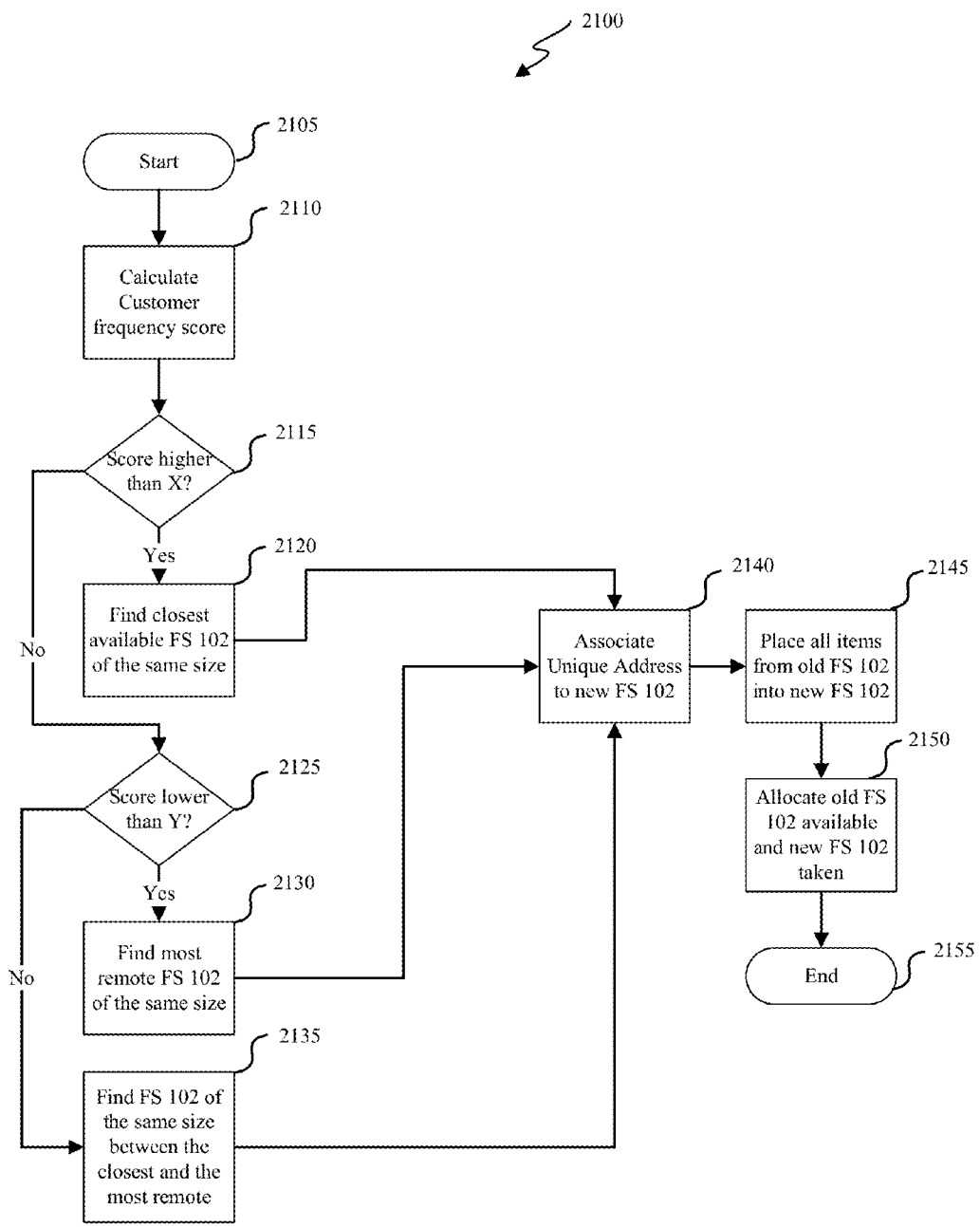
FIG. 21 is a flowchart of the concierge fixed storage workflow for locating a fixed storage more efficiently in a storage enclosure.

FIG. 21 is a flowchart of the concierge fixed storage workflow for locating a fixed storage more efficiently in a storage enclosure. Shuffle fixed storage 2100 is closely related to full fixed storage 2000. Shuffle fixed storage 2100 becomes necessary when the location of the user's fixed storage 102 in the storage enclosure 128 is not at the most efficient location in the storage enclosure. For instance, a user can have a very high frequency score that exceeds the high threshold "X" but have a fixed storage 102 located in the back of the storage enclosure 128 where it is most costly to retrieve objects to process and ship. Shuffle fixed storage 2100 starts at stem 2105. At block 2110 the storage concierge 108 calculates the user's frequency score. The frequency score is calculated by any number of methods including, but not limited to, average number of shipment requests per month for the user, the highest number of cumulative shipment requests for the user in a storage enclosure 128, and/or any other method of computing a frequency score. Predetermined thresholds are computed for the storage enclosure by any number of methods including the average shipping rate for the storage enclosure 128 per month; which is computed by taking the number of shipping requests in a month for the entire storage enclosure 128 and dividing that number by the number of user fixed storage 102 in the storage enclosure 128. Then, for example, a high threshold "X" can be any % over 50%, and a low threshold "Y" can be any percent under 50%. The high and low threshold can change over time based on various criteria. Once a user's frequency score exceeds the predetermined threshold "X," as determined at block 2115, the storage concierge 108 finds the closest available fixed storage 102 in the storage enclosure 128 of the same size and then proceeds to block 2140. If the frequency score at block 2115 is not higher than "X," then the storage concierge determines if the frequency score is lower than a predetermined threshold, "Y" at block 2125. If the score is lower than "Y," the concierge fixed storage 102 finds the most remote available fixed storage 102 in storage enclosure 128 of the same size and then proceeds to block 2140. If the frequency score is not lower than "Y" at block 2125 then the storage concierge 108 finds the available fixed storage 102 of the same size between the closest and most remote fixed storage 102 of the same size and proceeds to block 1040. At that block the storage concierge 108 associates the user's Unique Address with new fixed storage 102 and then places all of the objects from the old fixed storage 102 to the new fixed storage 102 at block 2145. At block 2150 it allocates the old fixed storage 102 as available in storage enclosure 128. shuffle fixed storage 2100 ends at block 2055.

Figure 22:
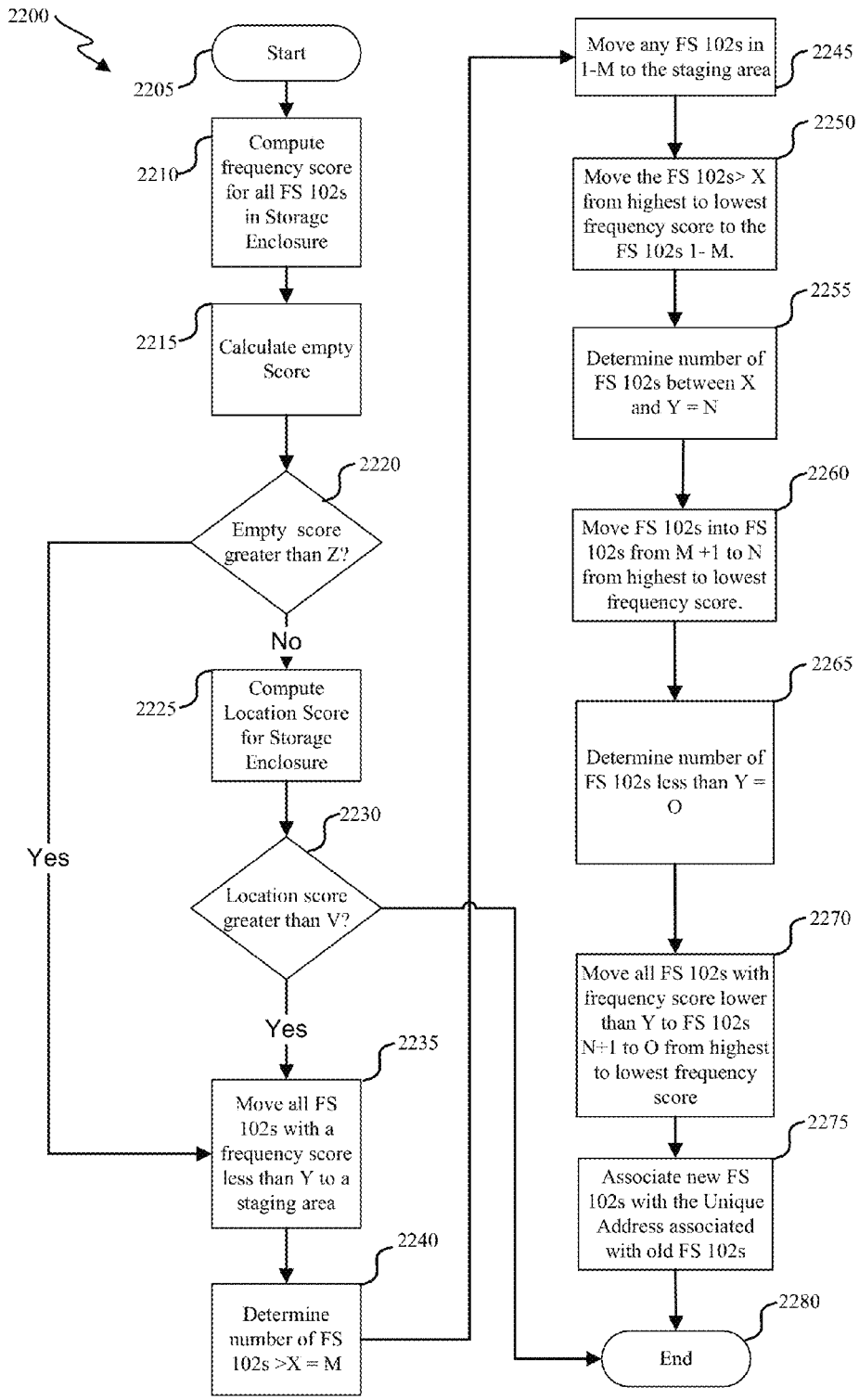

FIG. 22 is a flowchart of the concierge fixed storage workflow for locating and more efficiently allocating fixed storage in a storage enclosure. The storage enclosure 128 may, in some embodiments, need to periodically relocate user fixed storage 102 inside a storage enclosure 128 for many reasons including efficiency. Because of full fixed storage 2000, fixed storage shuffle 2100, new users, and users terminating, empty fixed storage 102 can accumulate in the storage enclosure making it particularly inefficient for the storage concierge 108 to access objects in user fixed storage 102 to ship them and return them after shipping. Storage enclosure shuffle 2200 starts at block 2205. The frequency score for all user fixed storage 102 in use is calculated according to the methods discussed previously or other methods at block 2210. Then at block 2215, the storage concierge 108 calculates an empty score that represents the empty fixed storage 102 in the storage enclosure. This score can be calculated by any number of methods, including but not limited to: adding up the number of fixed storage 102 that are empty and dividing by the number of fixed storage 102 in the storage enclosure 128; adding up all of the empty fixed storage 102 that are between the beginning of the storage enclosure and the last fixed storage 102 in use and dividing by the number of fixed storage 102 between the beginning of the storage enclosure and last fixed storage 102 in use; or dividing the number of fixed storage 102 in use by the number of fixed storage 102 not in use. Once an empty score is determined the next block 2220 is to determine if that score is above a threshold "Z." Z may be any number in any of the examples or 0.5 or higher, for example. If the empty score is greater than Z then the storage concierge 108 proceeds to block 2235. If the score is not greater, then it computes a location score for the storage enclosure at block 2225. The location score is calculated using a combination of each of the closet's 102 frequency scores and the location in the storage enclosure 128 where that fixed storage 102 is located. If that location score exceeds a threshold "V," then the next block is 2235. If it does not the next block is the end at 2280. At block 2235, the storage concierge 108 moves all fixed storage 102 with a frequency score less than Y to a staging area. At block 2240 the storage concierge 108 determines the number of fixed storage 102 with a frequency score greater than X as M. Then at block 2245, it removes any fixed storage 102 in 1-M to the staging area. At block 2250 it moves the M fixed storage 102 with highest frequency scores to the 1-M fixed storage 102 in order of highest to lowest frequency. Next the storage concierge 108 determines the number of fixed storage 102 between X and Y frequency scores as the number N at block 2255. At block 2260 it moves the fixed storage 102 with frequency scores between X and Y into fixed storage M+1 to N from highest frequency score to lowest frequency score—moving any occupied fixed storage 102 in the way to their proper location. The number of fixed storage 102 less than Y as O is determined at block 2265 and they are moved into their proper location from N+1 to O in order of decreasing frequency scores at block 2270. At this point all of the empty fixed storage 102 are located at positions higher than O+1. It can be appreciated that there might need to be some flexibility by leaving empty fixed storage 102 in any of the areas and so the M, N, and O numbers may be padded before moving fixed storage 102. This would allow the storage concierge 108 to place new users in the appropriate area or accommodate moving existing user fixed storage 102 to a different geographic storage enclosure 128 at the correct position for the fixed storage 102 frequency score. At block 2275 all of the new fixed storage 102 are associated with the user's Unique Address and shuffle storage enclosure 2200 ends at block 2280.

Figure 23:
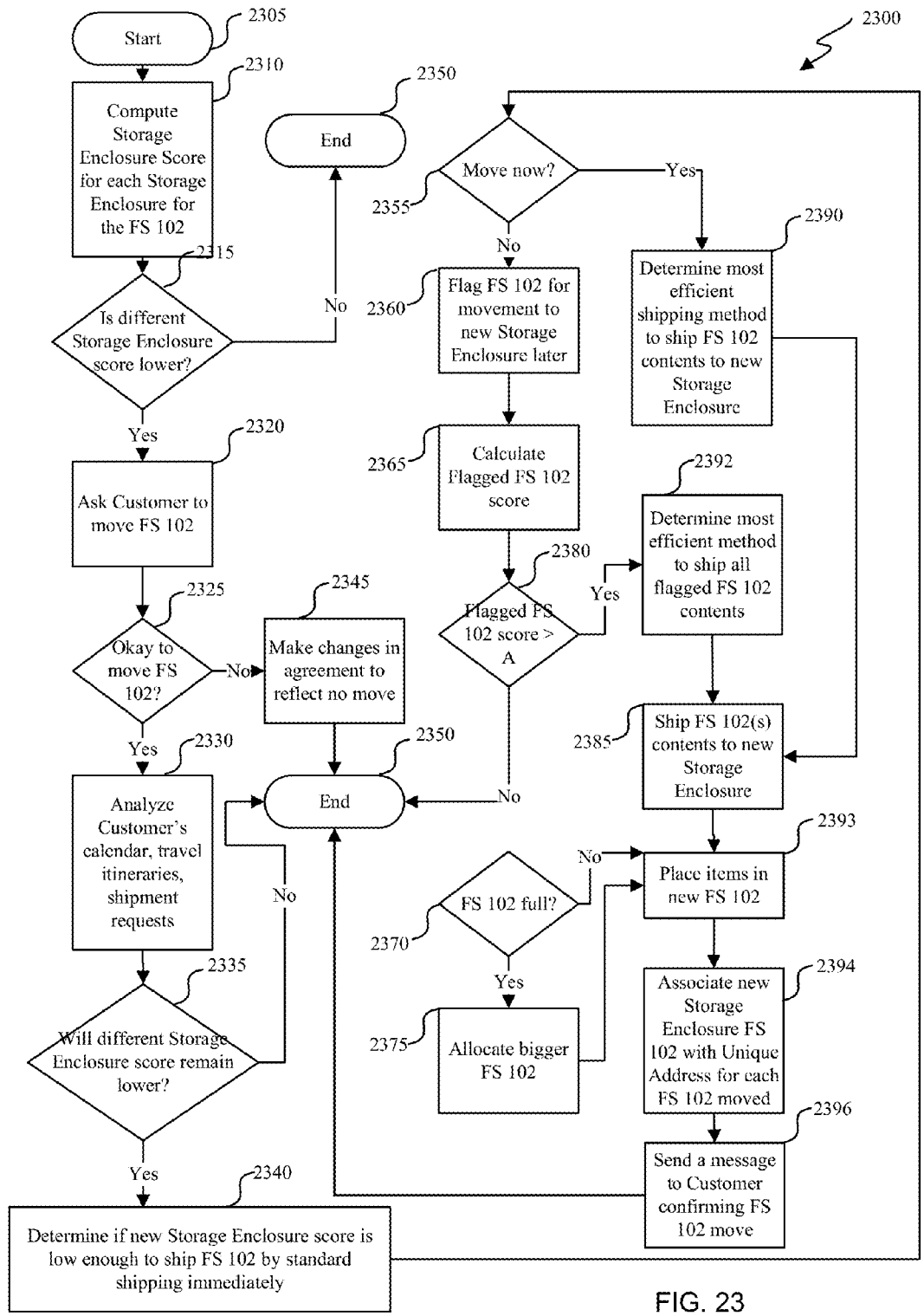
FIG. 23 is a flowchart of the concierge fixed storage workflow for locating a fixed storage more efficiently in a geographically different storage enclosure.

FIG. 23 is a flowchart of the concierge fixed storage workflow for locating a fixed storage more efficiently in a geographically different storage enclosure 128. When a user's fixed storage 102 is located at a storage enclosure disproportionately separated from the shipping destination for the user's objects, the storage concierge 108, in some embodiments, moves the user's fixed storage to a different storage enclosure 128 closer to the destination where the user has transitory storage 132 shipped the most often. Geography shuffle 2300 begins at block 2305. At block 2310 the storage concierge computes the a storage enclosure 128 score for the user fixed storage at each storage enclosure 128. In one embodiment the score is computed by for each storage enclosure 128 by adding the number of miles from the storage enclosure to the shipping destination for objects in the fixed storage for a period of days, weeks, months, or years. If there is no storage enclosure 128 with a lower score than the storage enclosure 128 the fixed storage 102 currently resides at, the geography shuffle 2300 is at and end at block 2350. If, at block 2315 there is a storage enclosure 128 with a lower score, the concierge fixed storage 108 asks the user if it is okay to move the fixed storage 102 to the lower scoring storage enclosure 128 at block 2320. If the user responds at block 2325 that it is not okay to move their fixed storage 102 to the lower scoring storage enclosure 128, the storage concierge 108 may need to make changes to the user agreement at block 2345 to reflect a high shipping cost due to user preference before ending geography shuffle 2300 at block 2350. If the user agrees to moving their fixed storage 102 at block 2325, the storage concierge 108 must then analyze the user's calendar, travel itineraries, future shipping requests, and user's feedback to determine if the current shipping pattern is likely to remain the same. At block 2335 the storage concierge determines if the lower scoring storage enclosure 128 will still be lower scoring after the analysis. If it will not be lower, geography shuffle 2300 ends at block 2350. If it will still remain lower, then the storage concierge 108 must determine if the score is low enough to ship the fixed storage 102 contents immediately at block 2340. For instance, if the next 3 requested destinations to ship transitory storage 132 are closer to the lower scoring storage enclosure 128, that would indicate that moving the fixed storage 102 immediately would be needed to save in shipping costs. If at block 2355 the score is low enough to justify shipping fixed storage 102 now, then at block 2390 the storage concierge 108 determines the most efficient way to move the fixed storage 102 to the lower scoring storage enclosure 128. At block 2385 it ships the fixed storage 102 to the lower scoring storage enclosure a then at block 2370 determines if the fixed storage is full. If it is full the storage concierge 108 allocates a bigger fixed storage at block 2375 and then places the fixed storage 102 contents into the new fixed storage 102. If the fixed storage is not determined to be full at block 2370, block 2375 is the next block. At block 2394 the storage concierge 108 associates the new fixed storage 102 location and storage enclosure 128 with the user's Unique Address for each moved fixed storage 102. The storage concierge 108 then notifies the user for every moved fixed storage 102 that their fixed storage 102 has been moved. At the next block 2350, geography shuffle is over. Returning to block 2355, if the new storage enclosure score is not low enough to ship the fixed storage 102 immediately, then the fixed storage 102 is flagged for movement to the lower scoring storage enclosure 128 at block 2360. Then, at block 2365, the storage concierge 108 calculates a flagged fixed storage score for the lower scoring storage enclosure 128. If that flagged score is not greater than a predetermined threshold A at block 2380, then geography shuffle 2300 is over at block 2350. If the flagged score is greater than A, then the storage concierge 108 determines the most efficient way to ship the flagged fixed storage 102 to the lower scoring storage enclosure 128 at block 2385.

The previously discussed blocks 2393, 2394, and 2396 are followed before finally ending geography shuffle 2300 at block 2350.

Figure 24:
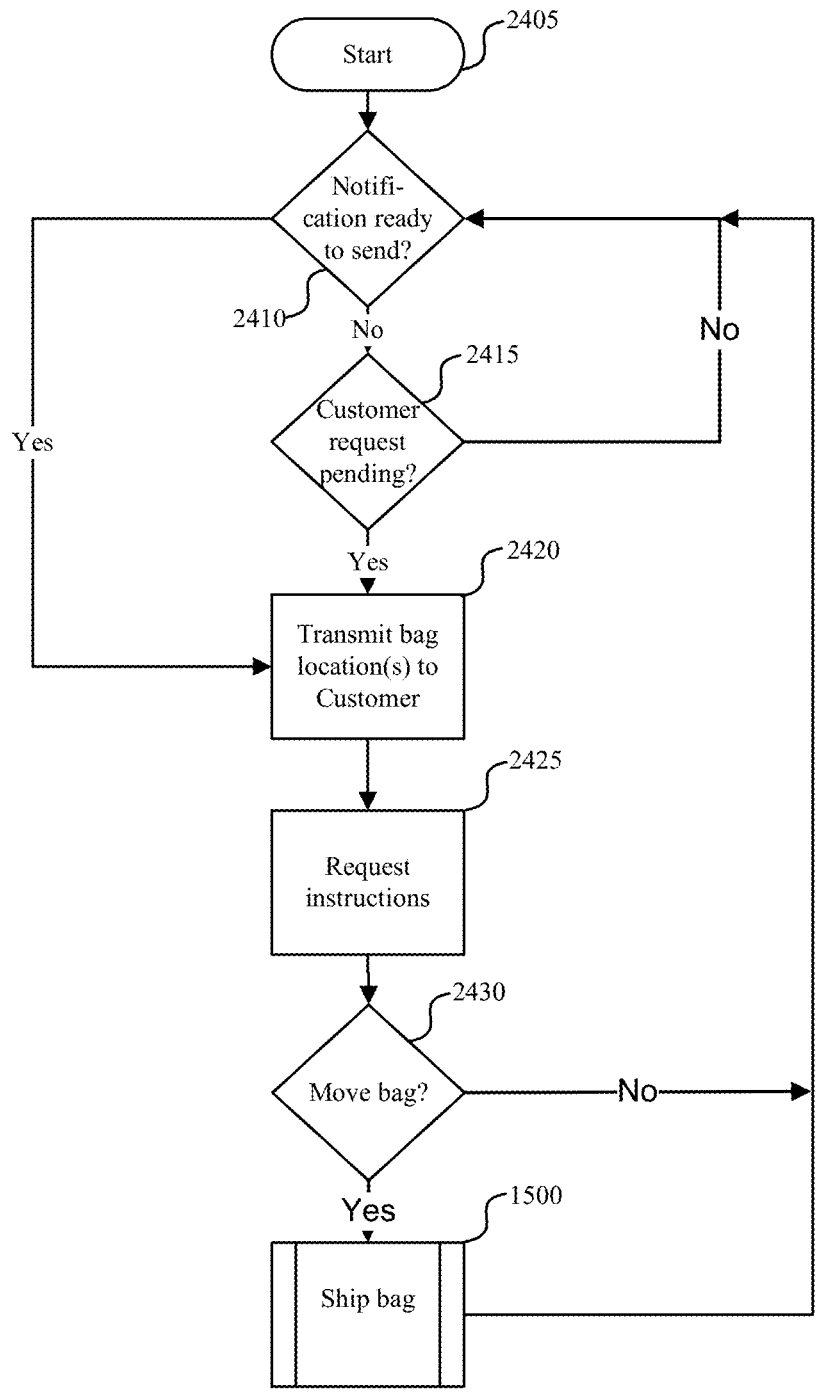
FIG. 24 is a flowchart of the concierge fixed storage workflow for tracking transitory storage.

FIG. 24 is a flowchart of the concierge fixed storage workflow for tracking transitory storage. The storage concierge 108 can notify the user of the location(s) of the bag(s) 132 containing the users objects. The notifications can include more than location—they may include a complete manifest, an estimated time of arrival at a desired location, an indication that the transitory storage 132 may arrive too late, and/or any other information related to the transitory storage 132. The process starts at block 2405 and checks to see if there is a notification ready to send the user at block 2410. I there is a notification ready to send—the next block is 2420. If there is not a notification ready to send then the concierge fixed storage 108 checks to see if there is a pending user request for a location at block 2415. If there is not—the next block is to return to block 2410. If there is a pending request, then the concierge fixed storage 108 transmits the transitory storage 32 location and other information to the user at block 2420. It then queries if the user wants to move the transitory storage 132 to a different location or otherwise change the routing of transitory storage 132 at block 2425. If the answer at block 2430 is yes—then ship transitory storage 1500 proceeds to ship the transitory storage and then returns to block 2410. If the answer at block 2430 is no—then the storage concierge 108 proceeds to block 2410 to wait to send a notification to the user.

Figure 25:
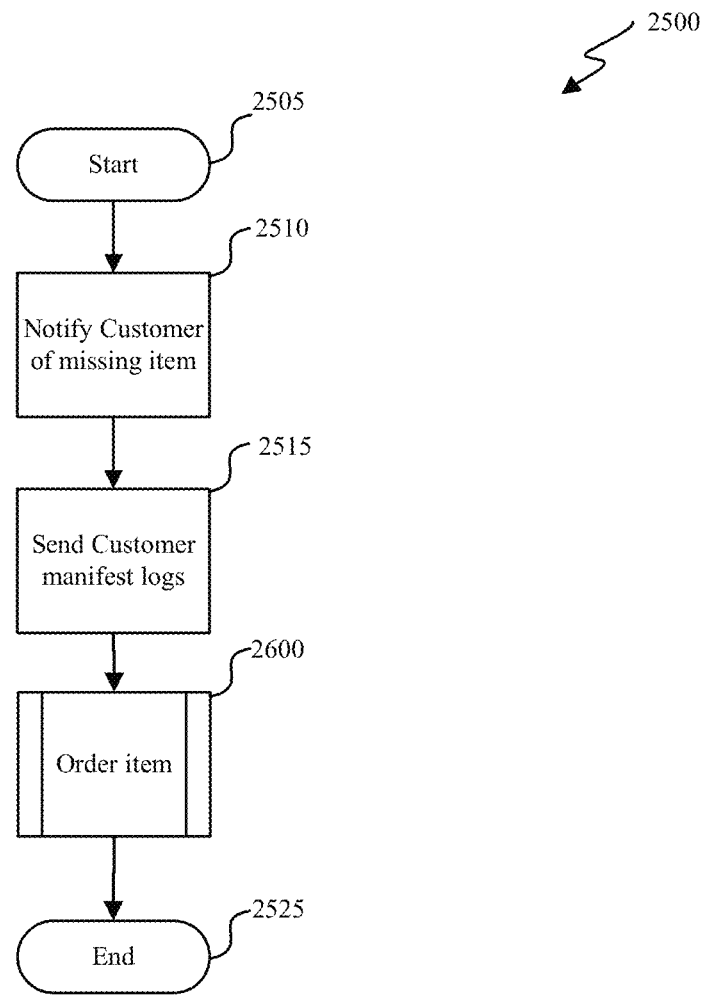
FIG. 25 is a flowchart of the concierge fixed storage workflow for managing missing objects in returned transitory storage.

FIG. 25 is a flowchart of the concierge fixed storage workflow for managing missing objects in returned transitory storage. When an object is missing from a user's returned transitory storage 132, the storage concierge 108 starts missing object 2500 at block 2505. The storage concierge 108 notifies the user that the object is missing at block 2510. Then at block 2515 it sends the user the manifest and logs for the transitory storage 132 with the missing object and proceeds to order object 2600. Missing object 2500 ends at block 2525.

Figure 26:
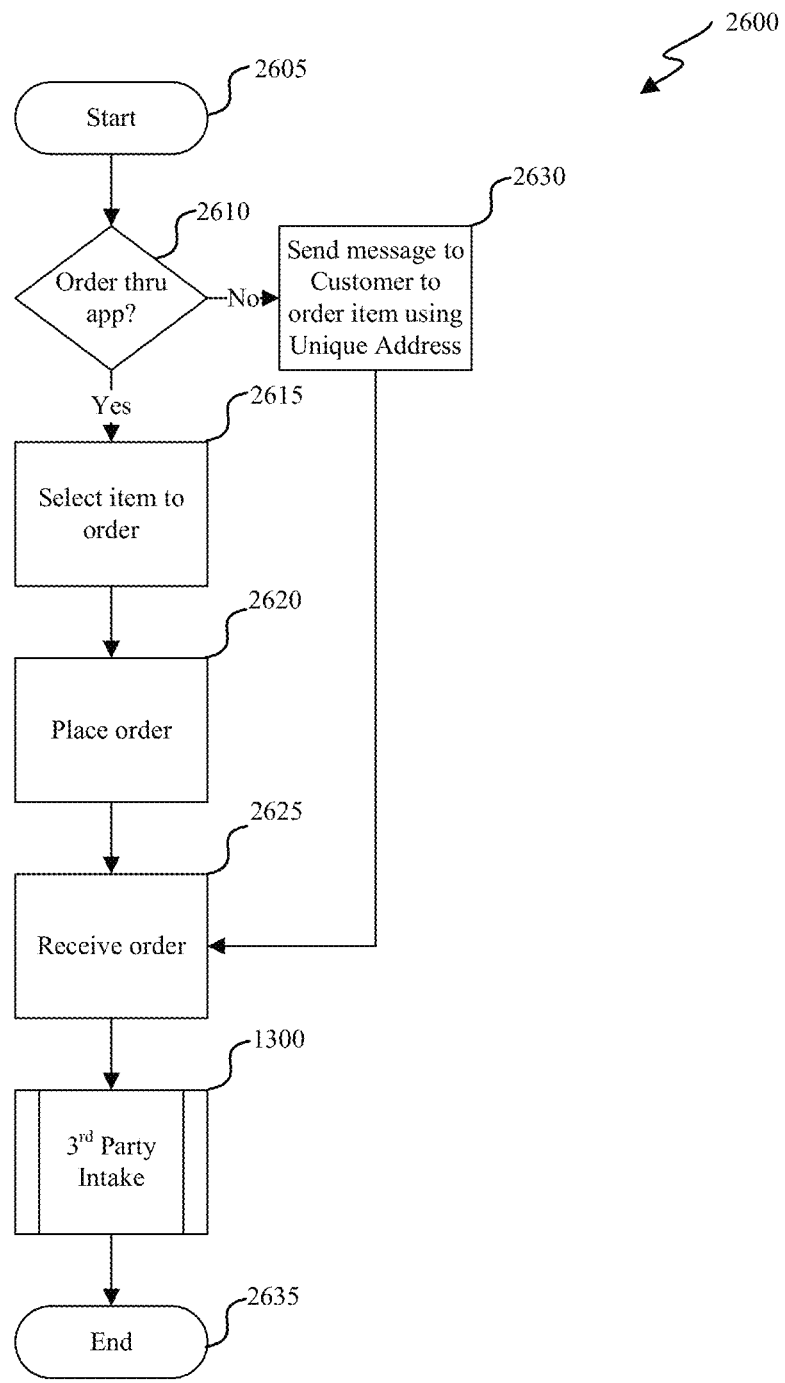
FIG. 26 is a flowchart of the concierge fixed storage workflow for ordering objects to be delivered to the closet.

FIG. 26 is a flowchart of the concierge fixed storage workflow for ordering objects to be delivered to the closet. Order object 2600 starts at block 2605. At block 2610 the storage concierge 108 provides the user the ability to order an object from the user device 120. If the user does not want to order from a merchandise provider 126 through the storage concierge 108 application, the storage concierge 108 sends a message to the user reminding the user to order an object using the Unique Address at block 2630 and then proceeds to block 2625. If the user does chose to order an object at block 2610, the storage concierge allows the user to select an object to order at block 2615 and place the order at block 2620. At block 2625 the storage concierge 108 receives the object and proceeds to $3^{rd}$ party intake 1300 to intake the object. At that point order object 2600 is finished at block 2635.

The above methods may be implemented by computer-program products that direct a computer system to perform the actions of the above-described methods and components. Each such computer-program product may comprise sets of instructions (codes) stored in a memory device. The instructions may be configured to run in sequential order, or in parallel (such as under different processing threads), or in a combination thereof.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interactiong with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, blocks and means described above may be done in various ways. For example, these techniques, blocks, blocks and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional blocks not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A processor-based method for operating a storage concierge, the processor-based method comprising:
   receiving, by an operator device, over a network, and from a user device, a request to create an account;
   assigning a unique address to a user device;
   creating a user account associated with the unique address:
   associating a first object, wherein the first object was received from the user of the user device or the first object was received from a third party provider, with the unique address;
   associating a first code with the first object and the unique address;
   associating a first digital image, of the first object, with the first code;
   storing the first digital image in a network available image storage device;
   automatically creating a workflow to process the first object by receiving instructions at the operator device from the user device;
   storing the workflow to process the first object in a network available workflow storage device;
   retrieving, by the operator device and over the network, the workflow from the network available workflow storage at a first time to process the first object;
   alerting the operator device that the workflow at the first time is complete; and,
   in response to the alerting, storing a second digital image, of the first object, in the network available image storage device;
   receiving a first request, over the network and from the user device to deliver the first object to a first location at a delivery time;
   in response to the receiving the first request:
      sending, over the network, a first shipping request to a first shipper device to pick up a storage device, wherein the storage device contains the first object, at a fixed storage location, and deliver the storage device to the first location;

receiving, by the operator device and over the network, a first tracking number from the first shipper device;

sending, by the operator device and over the network, a first message to the user device, wherein the first message includes the first tracking number;

receiving, by the operator device and over the network, an electronic notification from the first shipper device that the first object is at the first location;

sending, by the operator device and over the network, a second message to the user device, wherein the second message confirms delivery of the storage device at the first location;

receiving, by the operator device and over the network, a second request, from the user device, to pick up the first object from the first location at a pick-up time;

in response to the receiving the second request:

sending, by the operator device and over the network, a second shipping request to a second shipper device to pick up the storage device from the first location and return it to the fixed storage location;

receiving, by the operator device and over the network, a second tracking number from the second shipper device;

sending, by the operator device and over the network, a third message to the user device, wherein the third message includes the second tracking number;

receiving, by the operator device and over the network, a notification from the second shipper device that the storage device is at the fixed storage location;

sending, by the operator device and over the network, a fourth message to the user device, wherein the fourth message confirms delivery of the storage device at the fixed storage location;

storing a third digital image of the first object the network available image storage device;

retrieving the workflow at a second time to process the first object;

sending, by the operator device and over the network, a second alert to the operator device that the workflow at the second time is complete;

storing a fourth digital image of the first object in the image storage after the workflow at the second time is complete; and sending, by the operator device and over the network, the fourth digital image of the first object to the user device.

2. The processor-based method for operating a storage concierge of claim 1, wherein:
the delivery time is the next day; and
the first shipper delivers the storage device to the first location by expedited delivery.

3. The processor-based method for operating a storage concierge system of claim 1, wherein the storage device is sized to fit the first object.

4. The processor-based method for operating a storage concierge system of claim 1, further comprising:
determining the storage device will not arrive at the first location by the delivery time; and
sending a failure alert to the operator device.

5. The processor-based method for operating a storage concierge of claim 1, wherein the operator device runs a first application and the user device runs a second application, and wherein the first application is different from the second application.

6. The processor-based method for operating a fixed storage delivery system of claim 1, further comprising sending, by the operator device and over the network, a third alert, wherein the third alert indicates the workflow is complete, after the workflow is complete at the first time and/or after the workflow is complete at the second time.

7. The processor-based method for operating a storage concierge of claim 1, wherein the first code is a bar code, a QR code, or a radio frequency identification tag.

8. A system for operating a storage concierge, the system comprising:
a preference repository configured to:
store a workflow to process a first object; and
a logistics engine configured to:
assign a unique address to a user device;
create a user account associated with the unique address;
associate the first object, wherein the first object was received from the user or a third party provider, with the unique address;
associate a first code with the first object and the unique address;
associate a first digital image, of the first object, with the first code;
create, automatically, a workflow to process the first object by receiving instructions at the operator device from the user device;
retrieve the workflow at a first time to process the first object;
send a first alert to an operator device that the workflow at the first time is complete; and
receive a first request, from a user device and over the network, associated with the user account, to deliver the first object to a first location at a delivery time;
send a first request to a first shipper device to pick up a storage device wherein the storage device contains the first object, at a fixed storage location, and deliver the storage device to the first location;
receive a first tracking number from the first shipper device;
send a first message to the user device, wherein the first message includes the first tracking number and is associated with the user account;
receive a notification from the first shipper device that the first object is at the first location;
send a second message to the user device, wherein the second message confirms delivery of the storage device at the first location; and
receive a second request, from the user device associated with the user account, to pick up the first object from the first location at a pick-up time;
receive a second tracking number from the second shipper device;
send a third message to the user device, wherein the third message includes the second tracking number;
receive a notification from the second shipper device that the storage device is at the fixed storage location;
send a fourth message to the user device, wherein the fourth message confirms delivery of the storage device at the fixed storage location;
retrieve the workflow at a second time to process the first object;
send a second alert to the operator device that the workflow at the second time is complete;

send, over the network, the fourth digital image of the first object to the user device; and an image storage device configured to:
store the first digital image of the first object after receiving the first object;
store a second digital image of the first object after the workflow at the first time is complete;
store a third digital image of the first object after delivery at the fixed storage location; and
store a fourth digital image of the first object after the workflow at the second time is complete.

9. The system for operating a storage concierge of claim 8, wherein:
the delivery time is the next day; and
the first shipper delivers the storage device to the first location by expedited delivery.

10. The system for operating a storage concierge of claim 8, wherein the storage device is sized to fit the first object.

11. The system for operating a storage concierge of claim 8, wherein the logistics engine is further configured to:
determine the storage device will not arrive at the first location by the delivery time; and
send a failure alert to the operator device.

12. The system for operating a storage concierge of claim 8, wherein the operator device runs a first application and the user device runs a second application, and wherein the first application is different from the second application.

13. The system for operating a storage concierge of claim 8, wherein the logistics engine is further configured to send a third alert after the workflow is complete at the first time or after the workflow is complete at the second time.

14. The system for operating a storage concierge of claim 8, wherein the first code is a bar code, a QR code, or a radio frequency identification tag.

15. A non-transitory computer-readable medium having sets of instructions stored thereon for operating a storage concierge which, when executed by a computer, cause the computer to:
assign a unique address to a user device;
create a user account associated with the unique address:
associate a first object, wherein the first object was received from a user of the user device or the first object was received from a third party provider, with the unique address;
associate a first code with the first object and the unique address;
associate a first digital image, of the first object, with the first code;
store the first digital image in a network available image storage device;
create, automatically, a workflow to process the first object by receiving instructions at an operator device and from the user device;
store a workflow to process the first object;
retrieve a workflow at a first time to process the first object;
send a first alert to an operator device that the workflow at the first time is complete; and
store a second digital image, of the first object, in the image storage after the workflow at the first time is complete;
receive a first request, from a user device associated with the user account, to deliver the first object to a first location at a delivery time;
in response to the first request:
send a first request to a first shipper device to pick up a transitory storage, wherein the storage device contains the first object, at a fixed storage location, and deliver the storage device to the first location;
receive a first tracking number from the first shipper device;
send a first message to the user device, wherein the first message includes the first tracking number and is associated with the user account;
receive a notification from the first shipper device that the first object is at the first location;
send a second message to the user device, wherein the second message confirms delivery of the storage device at the first location;
receive a second request, from the user device associated with the user account, to pick up the first object from the first location at a pick-up time;
in response to the second request:
send a second request to a second shipper device to pick up the storage device from the first location and return it to the fixed storage location;
receive a second tracking number from the second shipper device;
send a third message to the user device, wherein the third message includes the second tracking number;
receive a notification from the second shipper device that the storage device is at the fixed storage location;
send a fourth message to the user device, wherein the fourth message confirms delivery of the storage device at the fixed storage location;
store a third digital image of the first object an image storage;
retrieve the workflow at a second time to process the first object;
send a second alert to the operator device that the workflow at the second time is complete;
store a fourth digital image of the first object in the image storage device after the workflow at the second time is complete; and
send, by the operator device and over the network, the fourth digital image of the first object to the first user device.

16. The non-transitory computer-readable medium having sets of instructions stored thereon for operating a storage concierge of claim 15, wherein:
the delivery time is the next day; and
the first shipper delivers the storage device to the first location by expedited delivery.

17. The non-transitory computer-readable medium having sets of instructions stored thereon for operating a storage concierge of claim 15, wherein the storage device is sized to fit the first object.

18. The non-transitory computer-readable medium having sets of instructions stored thereon for operating a storage concierge of claim 15, further comprising:
determining the storage device will not arrive at the first location by the delivery time; and
sending a failure alert to the operator device.

19. The non-transitory computer-readable medium having sets of instructions stored thereon for operating a storage concierge of claim 15, wherein the operator device runs a first application and the user device runs a second application, and wherein the first application is different from the second application.

20. The non-transitory computer-readable medium having sets of instructions stored thereon for operating a storage concierge of claim 15, wherein the first code is a bar code, a QR code, or a radio frequency identification tag.

\* \* \* \* \*